(12) United States Patent
Li

(10) Patent No.: US 12,474,847 B2
(45) Date of Patent: Nov. 18, 2025

(54) CUSTOMIZABLE SOLID-STATE DRIVE FOR IMPROVED CAPACITY AND ENDURANCE

(71) Applicant: MICROSOFT TECHNOLOGY LICENSING, LLC, Redmond, WA (US)

(72) Inventor: Peng Li, Beaverton, OR (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 18/193,161

(22) Filed: Mar. 30, 2023

(65) Prior Publication Data

US 2024/0329863 A1 Oct. 3, 2024

(51) Int. Cl.
*G06F 3/06* (2006.01)

(52) U.S. Cl.
CPC .......... *G06F 3/0634* (2013.01); *G06F 3/0604* (2013.01); *G06F 3/064* (2013.01); *G06F 3/0679* (2013.01)

(58) Field of Classification Search
CPC ...... G06F 3/0679; G06F 3/064; G06F 3/0604; G06F 3/0634; G06F 3/0629; G06F 3/061
USPC .................................. 711/154, 156
See application file for complete search history.

(56) References Cited

U.S. PATENT DOCUMENTS

| | | | |
|---|---|---|---|
| 9,961,015 B2 * | 5/2018 | Shibayama | G06F 3/0605 |
| 2016/0342344 A1 * | 11/2016 | Kankani | G06F 12/02 |
| 2019/0042130 A1 * | 2/2019 | Vittal Prabhu | G11C 11/5642 |
| 2020/0249875 A1 * | 8/2020 | Zhou | G06F 3/0604 |
| 2021/0255783 A1 * | 8/2021 | Ou | G06F 3/0659 |
| 2022/0011975 A1 * | 1/2022 | Wu | G06F 3/0632 |
| 2023/0053269 A1 * | 2/2023 | Yang | G11C 16/14 |
| 2023/0367507 A1 * | 11/2023 | Rathore | G06F 3/0679 |

OTHER PUBLICATIONS

International Search Report and Written Opinion received for PCT Application No. PCT/US2024/019336, Aug. 1, 2024, 16 pages.
Invitation to pay additional search fee received for PCT Application No. PCT/US2024/019336, Jun. 11, 2024, 11 pages.
International Preliminary Report on Patentability (Chapter I) received for PCT Application No. PCT/US2024/019336, mailed on Oct. 9, 2025, 11 pages.

* cited by examiner

*Primary Examiner* — Jared I Rutz
*Assistant Examiner* — Edward Waddy, Jr.
(74) *Attorney, Agent, or Firm* — Shook, Hardy & Bacon L.L.P.

(57) ABSTRACT

Embodiments generally relate to programming NAND blocks of a solid-state device (SSD) to any suitable block type and utilizing the programmed NAND blocks to efficiently process computer operations performed by a solid-state drive (SSD). Example block types include a single-level cell (SLC), a multi-level cell (MLC), a triple-level cell (TLC), or a quad-level cell (QLC). The block type are stored in a mapping table as an association designating the NAND block as being of a particular block type. For example, the mapping table includes entries indicating whether NAND blocks have been programmed as SLC, MLC, TLC, or QLC blocks. In this manner, the capacity, speed, and endurance is improved by allocating computer operations to target NAND blocks being of particular block types.

20 Claims, 11 Drawing Sheets

CUSTOMIZABLE SOLID-STATE DRIVE FOR IMPROVED CAPACITY AND ENDURANCE

BACKGROUND

In the context of the storage of data for access by computer systems, what began as a large six-foot tall disk storage device was replaced by much smaller hard disk drives. In general, hard disk drives (HDDs) are traditional storage devices with spinning platters that read and write data. Whereas HDDs utilize mechanical spinning disks and moving read/write heads to access data, solid-state drives (SSDs) generally use memory chips storing information on flash memory devices, such as NAND (short for "NOT AND") flash devices, without any mechanical spinning disks. As computing demand increased, those HDDs were later replaced by SSDs due to SSDs being even smaller, faster, quieter, and more durable than HDDs. Moreover, the growth of cloud computing technology has led to the more widespread adoption of SSDs in certain datacenters. However, certain datacenters treat SSDs as a one-size-fits-all solution for handling the wide range of distributed operations executed by datacenters. Accordingly, certain datacenters fail to efficiently implement SSDs.

SUMMARY

Various aspects of the technology described herein are generally directed to systems, methods, and computer storage media for, among other things, programming NAND blocks to any suitable block type and utilizing the programmed NAND blocks to efficiently process computer operations performed by a solid-state drive (SSD). Example block types include a single-level cell (SLC), a multi-level cell (MLC), a triple-level cell (TLC), or a quad-level cell (QLC). An SSD generally includes a memory chip storing information on NAND flash devices. Each NAND flash device generally includes a plurality of NAND flash dies. Absent the embodiments disclosed herein, certain NAND flash dies include a plurality of blocks that are all programmed as the same block type. Accordingly, absent the embodiments disclosed herein, certain NAND flash dies are generally configured with NAND blocks of the same block type, causing the NAND flash device's life span to be reduced by treating computer operations identically despite the different memory and bit requirements associated with those computer operations.

To solve this issue, embodiments of the present disclosure (1) program NAND blocks into different block types, and (2) determine a NAND block of a particular block type to process a computer operation based on bit requirements or other memory-related considerations associated with the computer operation. In more detail, embodiments of the present disclosure include establishing communication with a NAND flash device that includes a plurality of NAND blocks, and then programming a respective NAND block as a block type classified as an SLC, MLC, TLC, or QLC. The NAND blocks may be programmed as different block types despite being contained in different or similar NAND dies. The block type can be stored in a mapping table as an association designating the NAND block as a particular block type. In one example, an "association" refers to any suitable data structure or designation specifying the NAND block type for a particular NAND block. Example associations include metadata or a field in the mapping table indicating whether NAND blocks have been programmed as SLC, MLC, TLC, or QLC blocks. For example, the mapping table includes entries indicating whether NAND blocks have been programmed as SLC, MLC, TLC, or QLC blocks.

After the NAND blocks have been programmed to a block type and their block type stored in a mapping table, embodiments of the present disclosure include accessing the mapping table to allocate computer operations to NAND blocks based on their block type. In more detail, embodiments of the present disclosure receive, via an SSD controller of the SSD, an input indicative of a computer operation to be performed by the SSD. Thereafter, embodiments of the present disclosure include accessing a look-up table of information of the NAND flash device to generate, based on the information of the NAND flash device, an operation code (also known as opcode) associated with the computer operation. Embodiments of the present disclosure access the mapping table and determine the block type to be used to process the operation code based on the bit requirement associated with the opcode. Based on the operation code and the mapping table, embodiments of the present disclosure generate the computer operation to be performed by a target NAND block that is of the determined block type.

In this manner, the capacity, speed, and endurance is improved by allocating computer operations to target NAND blocks being of particular block types. In the context of capacity, capacity is efficiently utilized by directing the computer operation to the target NAND block based on a minimum capacity as defined by the block type. For example, a computer operation requiring 1 bit can be directed to a NAND block programmed and classified as an SLC, while a computer operation requiring 4 bits can be directed to a NAND block programmed and classified as a QLC. Because a NAND flash device and/or a corresponding NAND flash die can include NAND blocks of different block types, computer operations may be more quickly performed. Moreover, the endurance of NAND blocks can be prolonged by reprogramming the NAND blocks from a block type associated with a lower program/erase (P/E) cycle to another block type having a higher P/E cycle. Accordingly, the NAND flash device is not constrained by the die having the blocks associated with the lowest P/E cycle.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION OF THE INVENTION

Figure 1A:
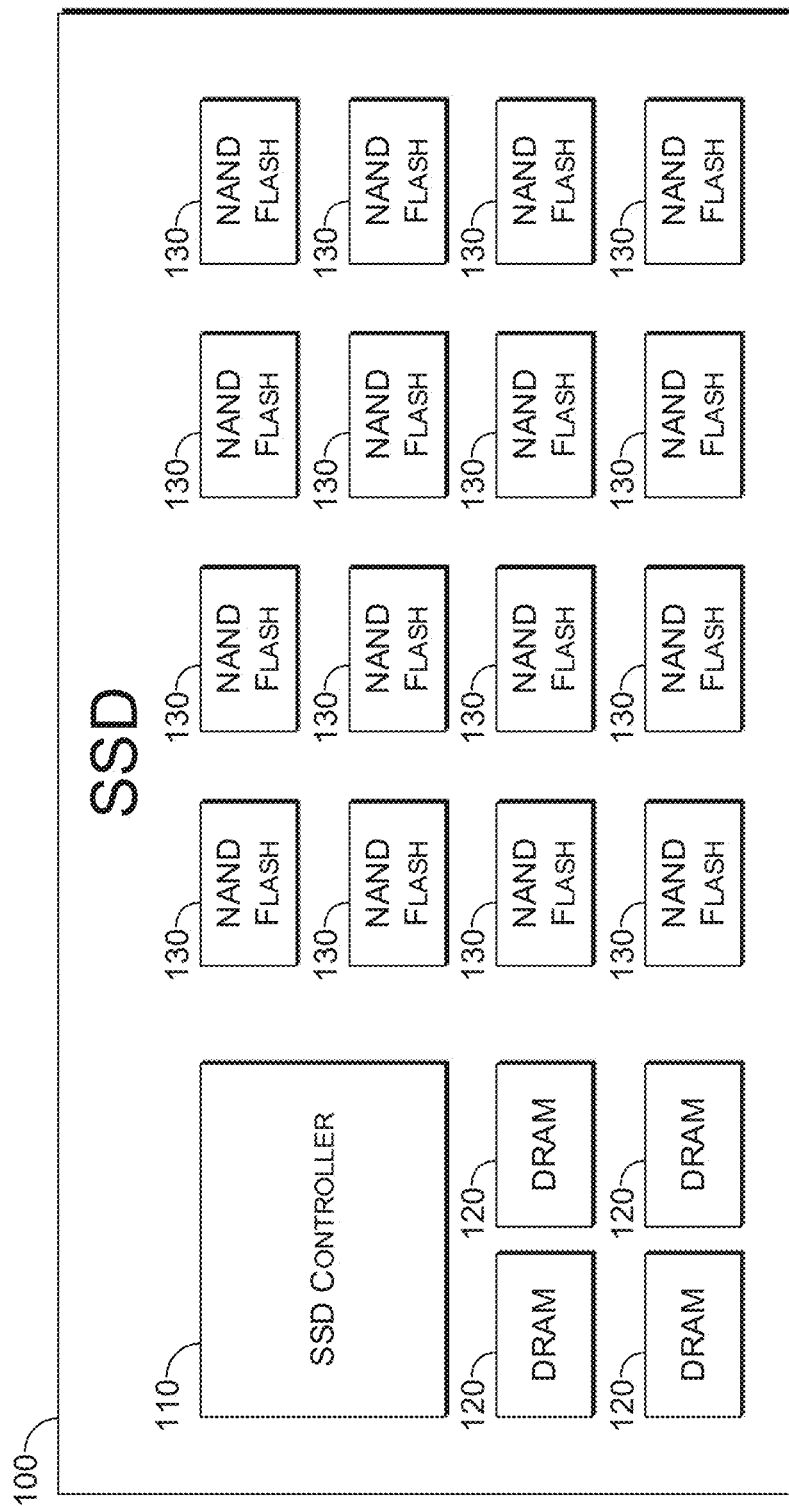
FIG. 1A depicts a block diagram of an example solid-state drive (SSD) configured to programmatically customize and employ blocks of a NAND flash device, in accordance with aspects of the technology described herein.
Figure 1B:
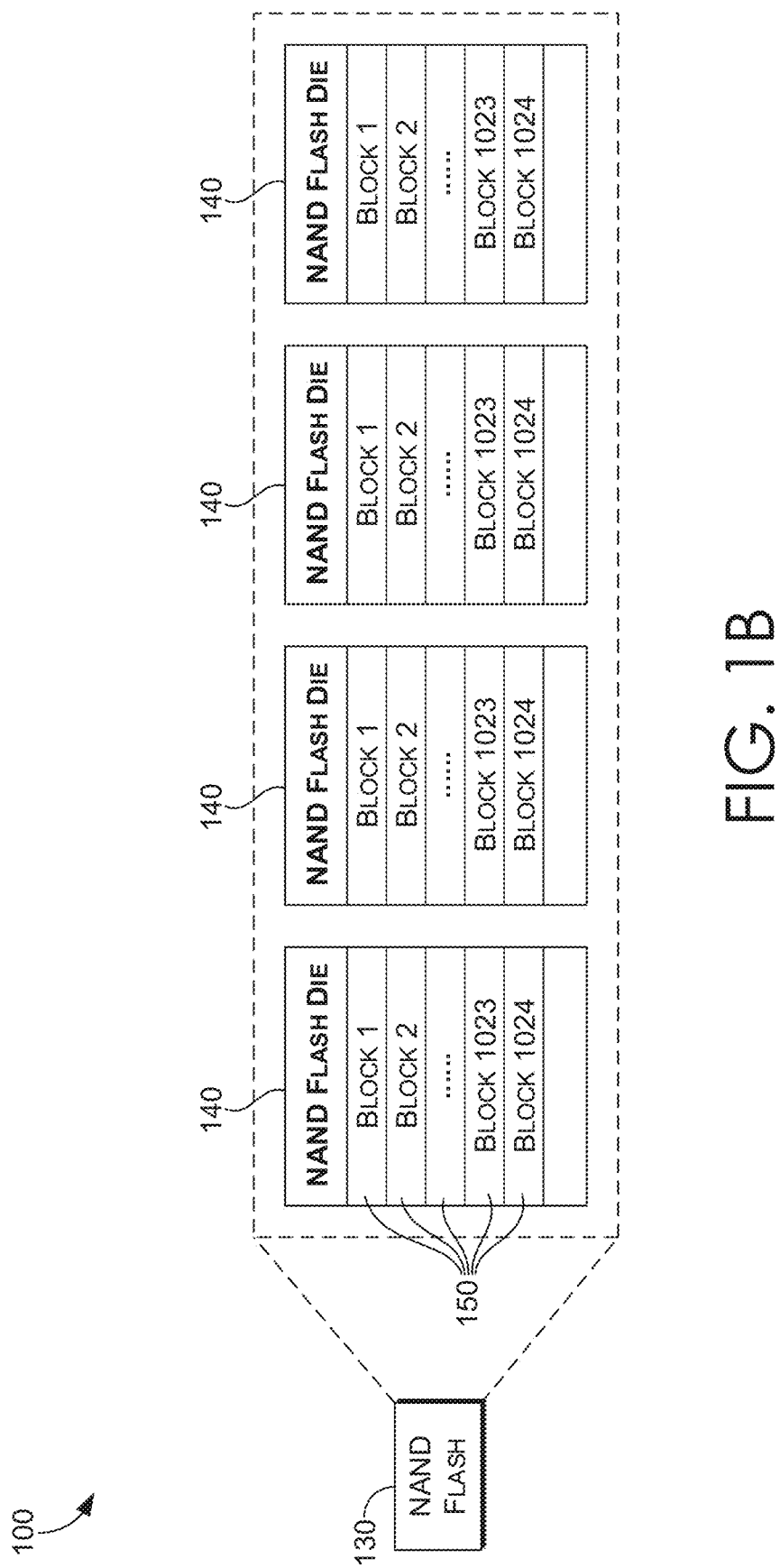
FIG. 1B depicts a block diagram of an example NAND flash device of the SSD of FIG. 1A, in accordance with aspects of the technology described herein.

Overview of Technical Problems, Technical Solutions, and Technological Improvements Certain datacenters treat SSDs as a one-size-fits-all solution for handling the wide range of distributed operations executed by datacenters. Certain SSDs are manufactured and programmed with an assembly of NAND flash devices and Dynamic Random Access Memories (DRAMs), such that the NAND flash devices include NAND flash dies, each with a plurality of NAND blocks. An example of this arrangement of components is illustrated in FIGS. 1A and 1B. Typically, and absent the embodiments disclosed herein, certain SSDs include similar NAND flash devices having similar NAND flash dies that include NAND blocks that are all of the same block type. For example, all NAND blocks contained in one SSD are single-level cells (SLCs), all NAND blocks contained in another SSD are multi-level cells (MLCs), all NAND blocks contained in another SSD are triple-level cells (TLCs), and all NAND blocks contained in another SSD are quad-level cell (QLCs).

Under this existing approach, datacenters employing many SSDs typically employ SSDs that will satisfy workloads under the worst-case scenario. In one example, the "worst-case scenario" refers to the memory requirement (for example, bit requirements) of an SSD necessary to maintain uninterrupted operations of certain workloads. For example, for a workload consisting of mixed read and write operations, the "worst-case scenario" includes the minimum capacity to handle these mixed read and write operations. In some instances, the "worst-case scenario" is used to determine the target endurance and performance level of an SSD. In one example, "endurance" is described in terms of Data Writes Per Day (DWPD) for a certain warranty period (for example, three or five years). In other words, if a one-terabyte (TB) SSD is specified for one DWPD, it can withstand one TB of data written to it every day for the warranty period. On the other hand, "performance level," in one example, refers to how well the SSD functions when accessing, retrieving, or saving data. Because the "worst-case scenario" can be used to determine the target endurance and performance level of an SSD, certain "worst-case scenarios" are device-specific and are a consideration for choosing to employ SSDs in a datacenter.

However, because real-world workload varies based on users and their workflows, selecting SSDs based on "worst-case scenarios" causes the bandwidths of certain NAND flash devices to become highly saturated, as the more frequently executed operations associated with the workflows cause certain NAND flash devices to more quickly achieve their solid-state storage program cycles (referred to herein also as "P/E cycles"). In one example, P/E cycle refers to the process of erasing and writing to NAND flash devices, and the more P/E cycles that the NAND technology can sustain, the better the endurance of the device. A more detailed discussion of P/E cycles across the different block types is discussed below with respect to FIG. 2. Operating under a one-size-fits-all approach or under the worst-case scenario causes certain NAND flash devices to become highly saturated, while their P/E cycles are far from being worn out. Accordingly, certain datacenters fail to efficiently implement SSDs.

One possible solution would be to change the manufacturing of SSDs, such that SSDs are manufactured with NAND flash devices having different NAND blocks. However, such a solution is resource-intensive and requires hardware-level modifications, which are further compounded by global chip shortages and other supply chain-related issues. Additionally, this solution fails to provide a way to quickly change the configuration of NAND blocks within the flash device. An alternative solution may include making software-level modifications, the implementation of which is difficult to achieve given the complexities of SSD technology.

With this in mind, embodiments of the present disclosure include software-level modification for programming NAND blocks to any suitable block type and utilizing the programmed NAND blocks to efficiently process computer operations to be performed by the SSD. Example block types include SLC, MLC, TLC, and QLC. SSDs generally include a memory chip storing information on NAND flash devices. Each NAND flash device generally includes many NAND flash dies. Absent the embodiments disclosed herein, each NAND flash die includes a plurality of blocks that are all programmed as the same block type. Accordingly, absent the embodiments disclosed herein, NAND flash dies are generally configured with NAND blocks of the same block type, causing the NAND flash device's life span to be reduced by treating computer operations identically, despite the different memory and bit requirements associated with those computer operations.

To solve this issue, embodiments of the present disclosure: (1) program NAND blocks into different block types, (2) determine a target NAND block programmed to a particular block type based on bit requirements or other memory-related considerations associated with the computer operation, and (3) generate and direct a computer operation to the target NAND block to improve the capacity, endurance, and performance level of a SSD. In this manner, an out-of-the-box SSD can be configured based on user workflows without needing to make any hardware-level modification.

In more detail, embodiments of the present disclosure include establishing communication with a NAND flash device that contains a plurality of NAND blocks; and, subsequent to establishing the communication, programming a respective NAND block as a block type classified as an SLC, MLC, TLC, or QLC. The NAND blocks may be programmed as different block types despite being contained in different or similar NAND dies. The block type can be stored in a mapping table as an association designating the NAND block as being of a particular block type. For example, the mapping table includes entries indicating whether NAND blocks have been programmed to the following block types: SLC, MLC, TLC, or QLC.

After the NAND blocks have been programmed to a block type and their block type stored in a mapping table, embodiments of the present disclosure include accessing the mapping table to allocate computer operations to NAND blocks based on their block type. In more detail, embodiments of the present disclosure receive, via an SSD controller of the SSD, an input indicative of a computer operation to be performed by the SSD. Thereafter, embodiments of the present disclosure include accessing a look-up table of information of the NAND flash device to generate, based on the information of the NAND flash device, an operation code associated with the computer operation. In one example, the "operation code" refers to a portion of a machine language instruction that specifies an operation, such as read and delete commands, to be performed. Certain operation codes require a certain bit amount to be performed. In addition to the operation code, certain machine language instructions also specify the data structure on which the operation is to be performed. While the machine language instructions specifying the data structure are generally consistent across NAND flash devices, the operation code can vary across NAND flash devices.

Embodiments of the present disclosure access the mapping table and determine the block type to be used to process the opcode, for example, based on the bit consumed by employing the operation code. Based on the operation code and the mapping table, embodiments of the present disclosure generate, based on the opcode and the mapping table, the computer operation to be performed by a target NAND block that is of the determined block type.

As set forth above, the capacity, speed, and endurance of certain SSDs is improved by allocating computer operations to target NAND blocks being of particular block types. In the context of capacity, capacity is efficiently utilized by directing the computer operation to the target NAND block based on a capacity associated with the block type. For example, a computer operation requiring 1 bit can be directed to a NAND block programmed and classified as an SLC, while a computer operation requiring 4 bits can be directed to a NAND block programmed and classified as a QLC. Because a NAND flash device and/or a corresponding NAND flash die can include NAND blocks of different block types, computer operations may be more quickly performed due to various block types being contained in one NAND flash, thereby decreasing response time. Moreover, the endurance of NAND blocks can be prolonged by dynamically reprogramming the NAND blocks from a block type associated with a lower P/E cycle to another block type having a higher P/E cycle. Accordingly, the NAND flash device is not constrained by the die having the blocks associated with the lowest P/E cycle.

Aspects of the technical solution can be described by way of examples and with reference to the figures. FIG. 1A illustrates an example solid-state drive (SSD) 100 having an SSD controller 110, at least one DRAM 120, and at least one NAND flash device 130. In the illustrated example, the SSD 100 includes one SSD controller 110, four DRAM 120, and sixteen NAND flash devices 130. In some embodiments, the NAND flash devices 130 are connected in parallel to the SSD controller 110 to scale bandwidth and reduce or hide latencies, for example, so long as enough outstanding operations are pending and the load is evenly distributed between the NAND flash devices 130.

In some embodiments, the SSD 100 is modular such that its components can be replaced by other components, can be removed, and/or other components can be added. Additionally, the SSD 100 can be communicatively coupled to other SSDs to scale and distribute workloads. In some embodiments, the SSD 100 is communicatively coupled to a host computing device that directs computer operations to the SSD 100. Example SSDs include those manufactured or configured by enterprises associated with ATP®, INTEL®, KIOXIA®, MICRON®, NVIDIA®, and SAMSUNG ELECTRONICS®, among many others.

Embodiments of the SSD controller 110 communicatively, electronically, and programmatically couple the components of the SSD 100, such as the illustrated DRAMs 120 and NAND flash devices 130 to a host computing device. An example host computing device includes the computing device 1000 and/or associated components of FIG. 10. In one embodiment, the SSD controller 110 is an embedded processor that executes firmware-level code to perform any number of functions. For example, the SSD controller 110 performs bad block mapping, read and write caching, encryption, crypto-shredding, error detection and correction (for example, via error correcting code [ECC] such as BCH code), garbage collection, read scrubbing management, read disturb management, and wear leveling, to name a few.

In one example, DRAM 120 refer to a random-access semiconductor memory that stores each bit of data in a memory cell, usually consisting of a small capacitor and a transistor. In some embodiments, DRAM 120 accesses data, generally in less than 10 microseconds, and is used to accelerate applications that would otherwise be held back by the latency of flash SSDs or traditional HDDs. One of the largest applications for DRAM 120 is the main memory (colloquially called the random-access memory "RAM") in certain computers and graphics cards (where the "main memory" is referred to as the graphics memory). DRAMs 120 can also be used in many portable devices and video game consoles. In some embodiments, DRAMs 120 incorporate either an internal battery or an external AC/DC adapter and backup storage system to ensure data persistence while no power is being supplied to the drive from external sources. For example, if power is lost, the battery provides power while all information is copied from random access memory (RAM) to backup storage. When the power is restored, the information is copied back to the RAM from the backup storage, and the SSD resumes normal operation (similar to the hibernate function used in modern operating systems).

In some embodiments, the NAND flash device 130 includes a non-volatile flash memory that can hold data even when it's not connected to a power source. In some embodiments, the NAND flash device 130 includes a metal-oxide semiconductor (MOS) integrated circuit chip that includes non-volatile floating-gate memory cells. In one embodiment, the NAND flash device 130 is packaged in standard disk drive form factors, such as 1.8-, 2.5-, and 3.5-inch form factors. However, small form factors, such as the M.2 form factor, are possible.

To improve read/write speed, embodiments of the SSD controller 110 can employ an architecture that includes data striping and interleaving. As mention herein, performance of the SSD 100 can scale through the parallel coupling of the NAND flash devices 130 to the SSD controller 110. For example, a single NAND flash device 130 is relatively slow due to the narrow (8/16 bit) asynchronous I/O interface and the high latency of basic I/O operations. By way of non-limiting examples, it can take about 25 microseconds (us) for the single NAND flash device 130 to fetch a 4 kilobyte (KiB) page from an array to an I/O buffer on a read operation. Furthermore, it can take about 250 us to commit a 4 KiB page from the I/O buffer to the array on a write operation, and it takes about 2 milliseconds (ms) to erase a 256 KiB block. When multiple NAND flash devices 130 operate in parallel inside an SSD, the bandwidth scales and the high latencies can be hidden as long as enough outstanding operations are pending and the load is evenly distributed between devices.

With reference to FIG. 1B, FIG. 1B includes an example NAND flash device 130, in accordance with aspects of the technology described herein. FIG. 1B includes components that correspond to components described with reference to FIG. 1A. For example, the NAND flash device 130 of FIG. 1B corresponds to one of the NAND flash devices 130 depicted in FIG. 1A.

As illustrated, the NAND flash device 130 includes four NAND flash dies 140, although the NAND flash device 130 may include any other number of NAND flash dies 140. In one example, a NAND flash die 140 refers to circuitry that includes a plurality of NAND blocks 150 that are able to perform computer operations associated with memory storage functions, such as read and write operations. In the illustrated example, four NAND flash dies 140 are illustrated, each having 1024 NAND blocks 150.

In some embodiments, a NAND block 150 contains a set number of pages. Within those pages are bytes for storing data and bytes that add more memory to each page and store error-correcting code. For example, a 512 kilobyte (KB) block can be arranged into 128 pages, each containing 4096 bytes, plus 128 additional error-correcting bytes per page. Although in the illustrated embodiment each NAND flash die 140 includes 1024 NAND blocks 150, the NAND flash dies 140 may include different numbers of NAND blocks 150.

In some embodiments, the SSD controller 110 (FIG. 1A) employs wear leveling to improve the lifespan of computer operations performed by the NAND flash devices 130. In one example, "wear leveling" refers to a technique whereby the SSD controller 110 distributes computer operations, such as by writing more evenly across all NAND blocks 150. For example, one NAND block 150 is programmed and erased repeatedly without writing to other NAND blocks 150, causing the one NAND block 150 to more quickly degrade and end the life of the SSD 100. By wear leveling, the SSD controller 110 may enhance the life of the SSD 100 by distributing workloads across all NAND blocks 150. In a perfect scenario, wear leveling enables every NAND block 150 to fail at the same time, thus increasing the lifespan of the SSD 100. In one embodiment, the process to evenly distribute write operations includes data (in one exampled referred to as "cold data") (1) previously written and (2) not changing to be moved, so that data that are changing more frequently (in one exampled referred to as "hot data") can be written into those blocks. In some embodiments, relocating data (1) increases write amplification and (2) adds to the wear of flash memory. Minimizing both can increase the lifespan of the SSD 100.

It should be understood that many components have been omitted from FIGS. 1A and 1B for the sake of simplicity and to facilitate discussion. Accordingly, embodiments of the SSD 100 are not limited only to those components illustrated or discussed herein. Indeed, it should be understood that any suitable components may be employed in addition or alternative to those components illustrated in FIGS. 1A and 1B, which may be replaced by any other suitable components.

There are several types of NAND flash devices 130. In one example, what separates and differentiates the NAND flash devices is the number of bits that can be stored per block. In one example, the bits refer to an electrical charge that can only hold one of two values, 0 or 1, or on/off. In general, 8 bits equals 1 byte. As discussed herein, example block types include SLC, MLC, TLC, and QLC. Example differences between the block types are the cost, capacity, and endurance, as discussed above.

Figure 2:
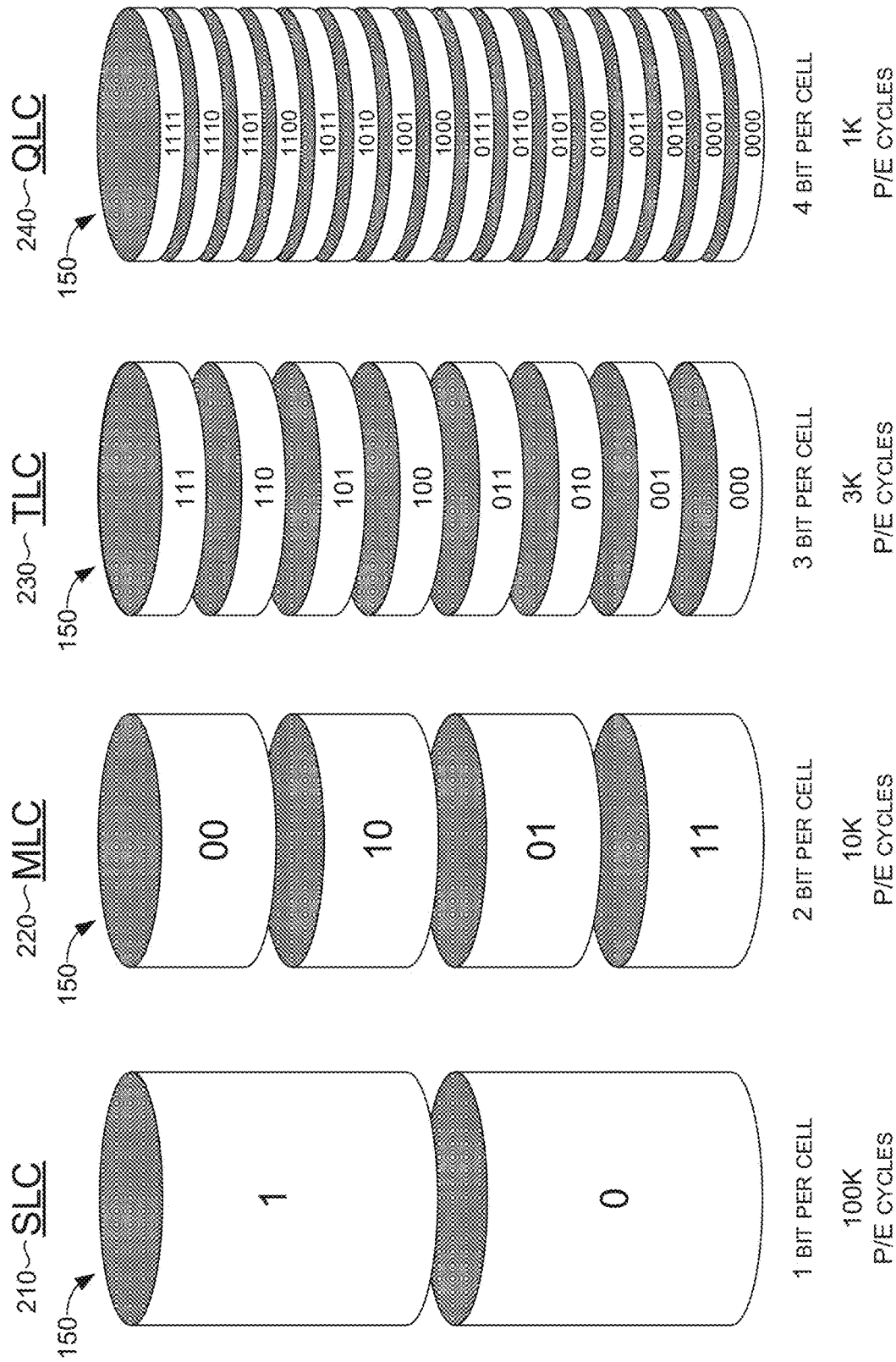
FIG. 2 depicts a block diagram of four example NAND blocks of a NAND flash die, such that the four example NAND blocks are classified as four different block types, in accordance with aspects of the technology described herein.

Turning to FIG. 2, depicted are four example NAND blocks 150 of a NAND flash die 140 (FIG. 1B), each classified as a different block type. These NAND blocks can be employed in an SSD. The four example block types are SLC 210, MLC 220, TLC 230, and QLC 240.

With reference to the SLC 210, embodiments of NAND blocks programmed as SLCs 210 generally only store 1 bit of information per NAND block. For example, each NAND block programmed as an SLC 210 stores either a 0 or 1, and, as a result, the data can be written and retrieved faster. Compared to MLC 220, TLC 230, and QLC 240, embodiments of the SLCs 210 provide better performance and higher endurance with about 100,000 P/E cycles. Accordingly, NAND blocks programmed as SLCs can last longer than the other block types. However, certain SLCs 210 have a low data density, making certain SLCs 210 more expensive and less common than other block types. For example, while SLCs 210 may not be common in consumer products, SLCs are more common in servers and other industrial applications that benefit from or require higher levels of speed and endurance.

With reference to MLC 220, MLCs store multiple bits per cell. For example, the MLC 220 stores 2 bits per corresponding NAND block. In some embodiments, NAND blocks programmed as MLCs 220 have a higher data density than NAND blocks programmed as SLCs 210. However, as compared to NAND blocks programmed as SLCs 210, NAND blocks programmed as MLC 220 can be more sensitive to data errors with 10,000 P/E cycles and therefore may have a lower endurance compared to SLC 210. In some embodiments, MLCs 220 are more common than SLCS in consumer products where endurance is less important.

With reference to the TLC 230, embodiments of a NAND block programmed as a TLC 230 stores 3 bits per cell. With reference to the QLC 240, embodiments of a NAND block programmed as a QLC 240 store 4 bits per cell. By adding more bits per cell, manufacturing costs can be reduced and the capacity can be increased. However, in some embodiments, an increase in capacity decreases performance and endurance. For example, NAND blocks programmed as TLCs 230 have about 3,000 P/E cycles, while NAND blocks programmed as QLCs 240 are lower at about 1,000 P/E cycles. Certain consumer products will use TLCs 230 or QLCs 240 because they are the cheapest options.

Figure 3:
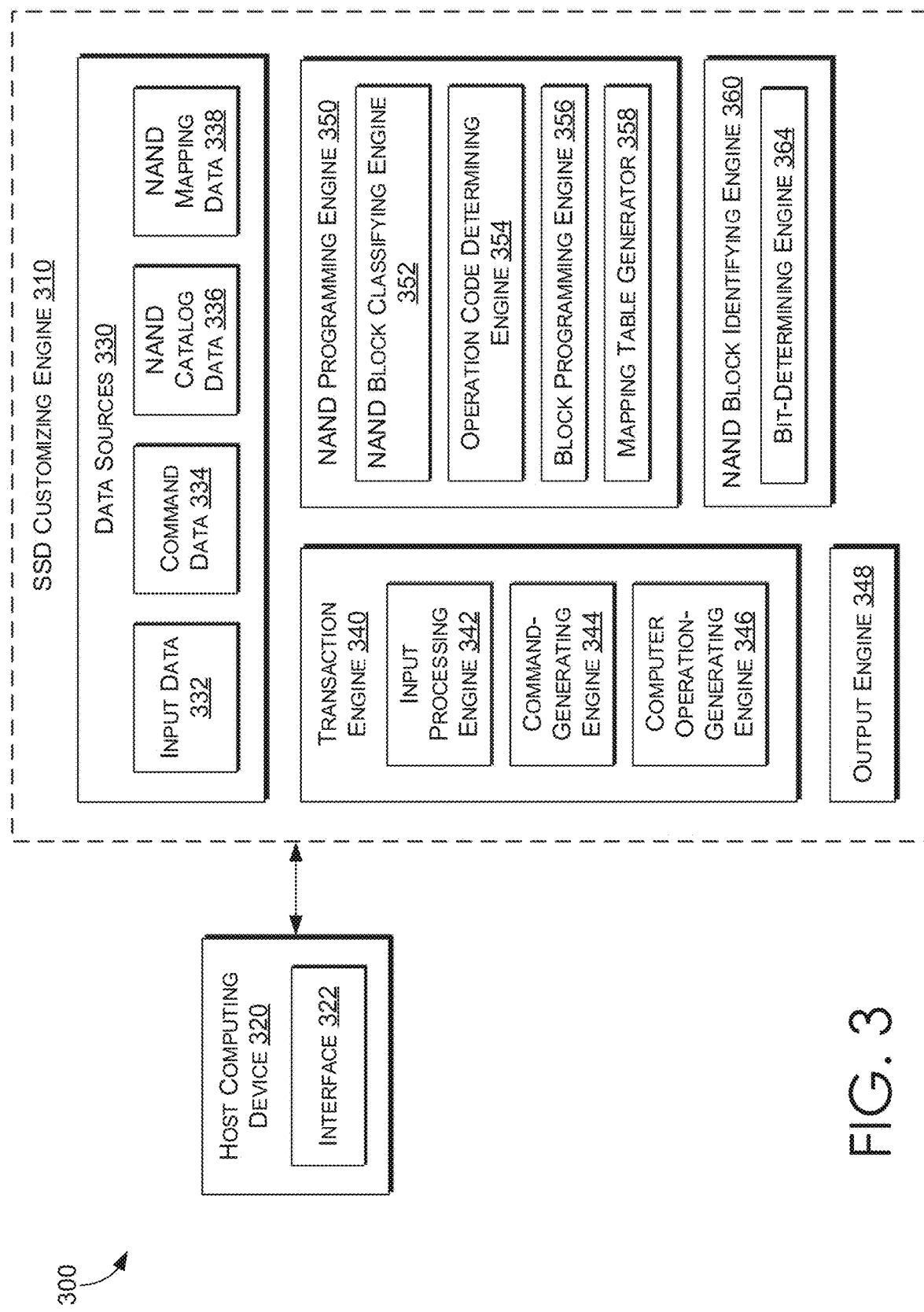
FIG. 3 depicts a block diagram of an example SSD customizing system employing an SSD customizing engine to programmatically customize and employ blocks of a NAND flash device, in accordance with aspects of the technology described herein.
Figure 4:
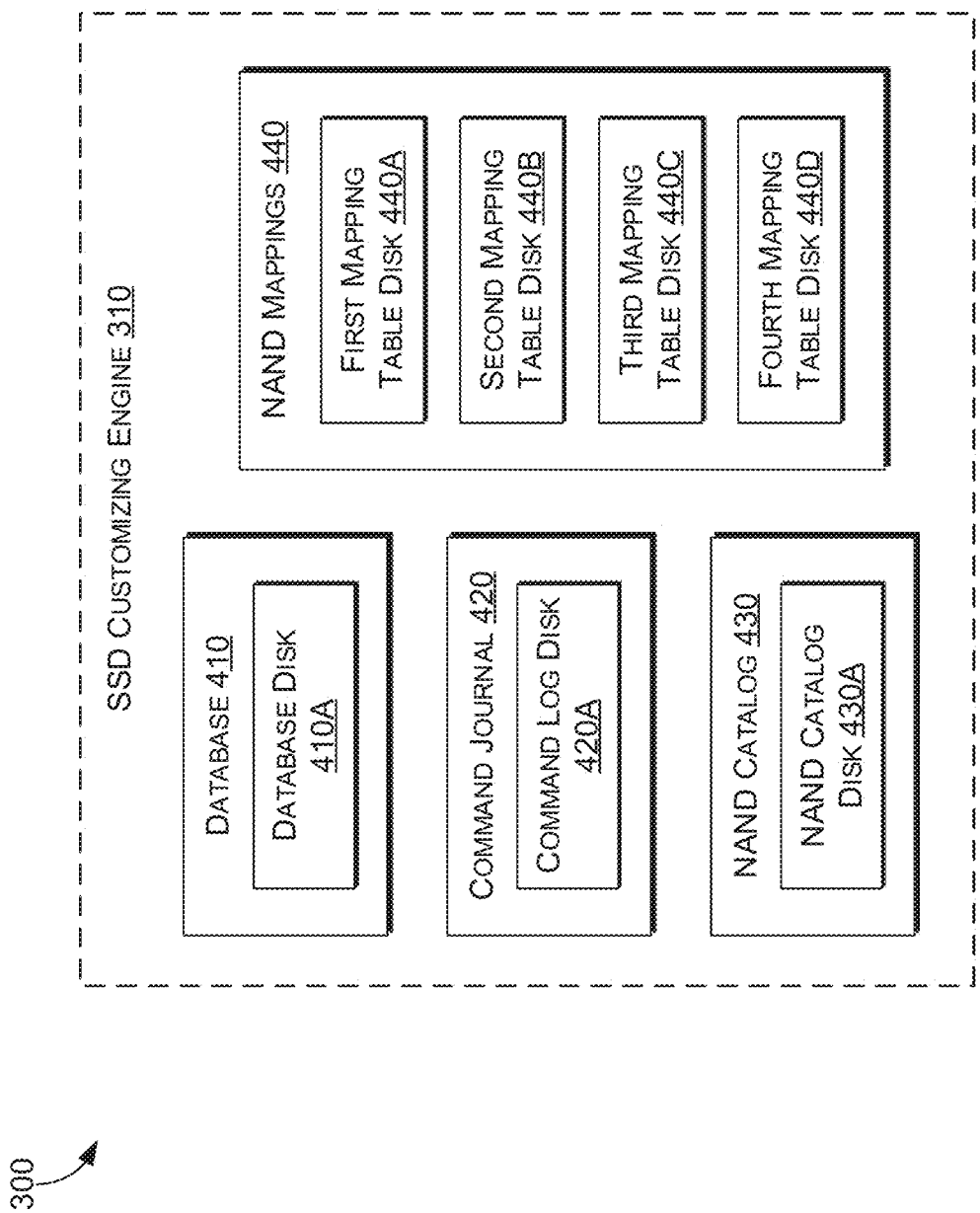
FIG. 4 depicts a block diagram of an example SSD customizing system employing an SSD customizing engine to programmatically customize and employ blocks of a NAND flash device, in accordance with aspects of the technology described herein.

Overview of Example Environments for Efficiently Programming and Utilizing NAND Blocks Using an SSD Customizing Engine in a SSD Customizing System Aspects of the technical solution can be described by way of examples and with reference to FIGS. 3 and 4. FIG. 3 is an example SSD customizing system 300 employing an SSD customizing engine 310 to programmatically customize and employ blocks of a NAND flash device, in accordance with aspects of the technology described herein. This example environment is further described with reference to FIGS. 9 and 10, for example, for use in implementing embodiments of the technical solution are shown. Generally, the technical solution environment includes a technical solution system suitable for providing the example SSD customizing system 300, which can employ methods of the present disclosure. Embodiments of the SSD customizing engine 310 are performed by the host computing device 320 or the SSD controller 110 (FIGS. 1A and 1B).

As illustrated, the SSD customizing system 300 includes an SSD customizing engine 310 communicatively coupled to the host computing device 320. Embodiments of the host computing device 320 include an interface 322 to communicate computer operations to the SSD customizing engine 310. In one embodiment, the interface 322 is configured to cause the host computing device 320 to interact with the infrastructure, components, or services provided by the SSD customizing engine 310. In one embodiment, the interface 322 includes logic to control or communicate data associated with the host computing device 320. For example, the interface 322 includes a serial peripheral interface (SPI), a serial I/O port, or any suitable interfacing mechanism to enable communication between the host computing device 320 and the SSD customizing engine 310. For example, a user may interact with a component of the host computing device 320, such as those illustrated with respect to FIG. 10, to cause the host computing device 320 to communicate the input to the SSD customizing engine 310.

Continuing with FIG. 3, the SSD customizing engine 310 includes data sources 330, which include input data 332; command data 334; NAND catalog data 336; NAND mapping data 338; transaction engine 340, which includes input processing engine 342, command-generating engine 344, computer operation generating engine 346, and an output engine; NAND programming engine 350, which includes NAND block classifying engine 352, operation code-determining engine 354, block programming engine 356, and mapping table generator 358; and NAND block identifying engine 360, which includes bit-determining engine 364.

In some embodiments, the transaction engine 340 is configured to process inputs from the host computing device 320 and direct the inputs throughout the SSD customizing system 300. Embodiments of the transaction engine 340 receive inputs and determine which subcomponent of the transaction engine 340 will process the input. In some embodiments, the inputs are stored in data sources 330 as input data 332. In one embodiment, the data sources 330 correspond to components illustrated in FIG. 1A, 1B, 9, or 10.

In some embodiments, the input processing engine 342 receives an input from the host computing device 320 to program a particular NAND block 150. For example, the input processing engine 342 receives an input to program a NAND block 150 as either an SLC, MLC, TLC, or QLC. In one embodiment, the input processing engine 342 determines that this input is associated with a command used to program a NAND block 150. In response, embodiments of the input processing engine 342 communicate this input to the command-generating engine 344.

In some embodiments, certain NAND blocks 150 are automatically programmed, for example, based on a classification associated with the NAND block 150. In one example, the NAND block 150 is classified based on a work flow task associated with the NAND block 150. For example, the NAND block classifying engine 352 classifies a NAND block 150 based on the computer operations that will be assigned to the NAND block 150. Alternatively or additionally, the NAND block classifying engine 352 classifies the NAND block based on an overall workflow performed by a data center. For example, the NAND block classifying engine 352 classifies NAND blocks 150 based on a percentage of past computer operations performed by a data center. Continuing this example, suppose a data center performs 20% of computer operations using the MLC block types and 60% of computer operations using TLC. In this example, the NAND block classifying engine 352 would classify 60% of NAND blocks as TLC block types and 20% of NAND blocks as MLC block types.

In some embodiments, the NAND block classifying engine 352 classifies blocks based on workloads associated with the SSD 100 or the SSD customizing system 300. Example workflows could be any number of tasks performed by a datacenter, including running applications, such as Office 365, SQL databases, and key-value databases.

In some embodiments, the command-generating engine 344 generates a command consumed by the NAND programming engine 350 to program the NAND block 150 based on the command. In one example, the command is used to program the NAND block 150 to a block type and may be based on the classification determined by the NAND block classifying engine 352. In one example, the input communicated from the input processing engine 342 includes a command specifying certain parameters associated with the NAND block 150. For example, the command specifies parameters, such as the SSD channel ID, NAND flash device ID, NAND flash die ID, and the block type for the NAND block. In another embodiment, the command-generating engine 344 generates this command with these parameters (for example, SSD channel ID, NAND flash device ID, NAND flash die ID, and the block type for the NAND block) based on the input.

In one embodiment, the command-generating engine 344 stores the command in the data sources 330 as command data 334. In this manner, the command is accessible to the NAND programming engine 350 via the data sources 330. Alternatively or additionally, the transaction engine 340 or the operation code-determining engine 354 may directly communicate the command to the NAND programming engine 350.

Different SSDs 100 (FIGS. 1A and 1B), for example, from different vendors use different operation codes to execute computer operations, such as program, erase, read, and write operations. In one embodiment, the information associated with the different SSDs 100 is stored in NAND catalog data 336. For example, the NAND catalog data 336 includes a look-up table that includes operation codes corresponding to various SSDs 100, SSD controllers 110 (FIG. 1A), NAND flash devices 130, NAND flash die 140, or NAND blocks 150. In one example, "a look-up table" refers to an array that replaces runtime computation with a simpler array-indexing operation, often using direct addressing. In some embodiments, employing a look-up table reduces costs of computation and operation since it offers the computational range without requiring the time and larger gate count associated with other storage mechanisms. Certain look-up tables can be easily customized to facilitate scaling. The look-up table may include operation codes corresponding to program, erase, read, and write operations that are specific to the SSDs 100 and their subcomponents. Although this example is discussed in the context of a look-up table, it should be understood that alternative or additional storing mechanisms, such as hashing, encryption, and so forth, can be employed in the embodiments disclosed herein.

In one embodiment, the operation code-determining engine 354 identifies the operation code from the NAND catalog data 336. For example, the operation code-determining engine 354 determines that the command includes programming a particular NAND block 150 as an MLC block type. To adequately program the NAND block, the operation code-determining engine 354 determines, from the look-up table, the operation code that can be consumed by the corresponding NAND block. In one embodiment, the operation code-determining engine 354 determines an erase and program operation code that is specific to the corresponding NAND block 150 so that the NAND block can be erased and programmed accordingly. Suppose the NAND flash device 130 is an out-of-the-box NAND flash device having NAND blocks programmed as a TLC block type and that the input includes a command to program a particular NAND block as an SLC. Thereafter, the command-generating engine 344 receives the operation code determined by the operation code-determining engine 354 and communicates it to the block programming engine 356.

In some embodiments, the block programming engine 356 programs the NAND block 150 into the block type based on the command from the command-generating engine 344. In one example, suppose the command includes (1) an operation code including erase or program, and (2) an indication specifying the particular NAND block 150 (for example based on SSD channel ID, NAND flash device ID, NAND flash die ID, and the block type for the NAND block) as an SLC, MLC, TLC, or QLC block type. The block programming engine 356 programs the NAND block as the block type included in the command.

Embodiments of the mapping table generator 358 generate a mapping table to include an association to the corresponding block type assigned to the NAND block. In this manner, the NAND block identifying engine 360 knows where to read data from when a future request is received. In one embodiment, the mapping table indexes the NAND blocks, the NAND flash die, and the NAND flash devices based on the block type. For example, the mapping table includes a unique ID corresponding to a particular NAND block and its corresponding block type. In some embodiments, the mapping table is saved in the NAND flash device 130 (FIGS. 1A and 1B). For example, certain NAND blocks 150 are classified as a block type that will execute operations associated with storing the mapping table. In one embodiment, the mapping table generator 358 stores the mapping table in the data sources 330 as NAND mapping data 338. In one embodiment, the mapping table is stored in the DRAM 120 (FIG. 1A).

In some embodiments, the mapping table generator 358 generates a mapping table corresponding to each block type. For example, the mapping table generator 358 generates a first mapping table corresponding to the SLC block type, a second mapping table corresponding to the MLC block type, a third mapping table corresponding to a third mapping table corresponding to the TLC block type, and a fourth mapping table corresponding to the QLC block type. In some embodiments, the mapping tables include an indication of the block type, the number of regions being of that block type, the start of the block ID per region being of that block type, and an end block ID per region being of that block type. In one embodiment, the mapping table is an inverse mapping table.

To help illustrate, a non-limiting example is discussed. For example, suppose that the SSD customizing system 300 is implemented as part of a datacenter configured to run any number of applications, such as productivity applications, SQL databases, and a key-value database. Certain existing approaches may default to employing an SSD having NAND blocks that are all high endurance TLC 230 (FIG. 1) block types. For example, a 6 TB SSD can be overprovisioned by 28%. In this example, the physical capacity of the SSD is calculated using equation 1.

$$6\text{ TB} * (1 + 28\%) = 7.68\text{ TB} \tag{1}$$

Suppose that each TLC NAND block is 384 MB. In this example, the overprovisioned SSD would include 20K NAND blocks. By employing the embodiments disclosed herein, each NAND block can be reprogrammed as an SLC 210 block type having 128 MB, an MCL 220 block type having 256 MB, a TLC 230 block type having 384 MB, or a QLC 240 block type having 512 MB.

Continuing this example, the embodiments disclosed herein enable a high level of SSD customization to increase the endurance or capacity of this SSD, for example, to either a 2 TB SSD having SLC 210 block types with high endurance but low capacity, an 8 TB SSD having QLC 240 block types with low endurance but high capacity, or any value there between. For example, suppose the write-intensive logical block addressings (LBAs) are only 10% of the entire LBA ranges of the target application. In this example, 2K NAND blocks can be configured as SLC blocks, and the remaining can be configured as QLC blocks with a 7% (or lower) overprovisioning. A usable logic capacity, assuming NAND blocks programmed as QLCs 240, can be calculated using equation 2 below:

$$(2K * 128\text{ MB} + 18K * 512\text{ MB})/(1 + 7\%) = 8.85\text{ TB}. \tag{2}$$

By employing these embodiments, the SSD customizing engine 310 can customize an out-of-the-box SSD based on any preferences, such as workloads, overprovisioning preferences, or intensity of LBAs. In one example, "overprovisioning" refers to providing additional capacity specifically for data to be erased from an SSD without interrupting system performance. The dedicated overprovisioning space may be adjusted to the user's preference, delivering benefits that include faster speed and longer SSD life. In one example, LBAs refer to techniques that allows a computer to address a hard disk larger than 528 megabytes. For example, an LBA is a 28-bit value that maps to a specific cylinder-head-sector address on the disk.

Continuing with FIG. 3, the NAND block identifying engine 360 determines a NAND block 150 to be used to perform a computer operation. In some embodiments, the transaction engine 340 receives an input indicative of a computer operation to be performed, such as a read operation. The computer operation generating engine 346 generates the computer operation based on the user input. For example, the user input may be a hardware-level command, such as the clicking of a mouse. In this example, the computer operation generating engine 346 translates the user input (in this example, the clicking of a mouse) into a particular computer operation, such as a read operation.

To determine which NAND block 150 will handle this computer operation, embodiments of the NAND block identifying engine 360 determine a NAND block 150 to handle the computer operation. In some embodiments, the NAND block identifying engine 360 includes a bit-determining engine 364 to determine the bits associated with the computer operation. As a first example, the bit-determining engine 364 determines that a computer operation is associated with 1 bit. In this example, the NAND block identifying engine 360 identifies a NAND block 150 that has been programmed as an SLC to handle the computer operation.

As a second example, the bit-determining engine 364 determines that a computer operation is associated with 2 bits. In this example, the NAND block identifying engine 360 identifies a NAND block 150 that has been programmed as an MLC to handle the computer operation.

As a third example, the bit-determining engine 364 determines that a computer operation is associated with 3 bits. In this example, the NAND block identifying engine 360 identifies a NAND block 150 that has been programmed as a TLC to handle the computer operation.

As a fourth example, the bit-determining engine 364 determines that a computer operation is associated with 4 bits. In this example, the NAND block identifying engine 360 identifies a NAND block 150 that has been programmed as a QLC to handle the computer operation.

Figure 5:
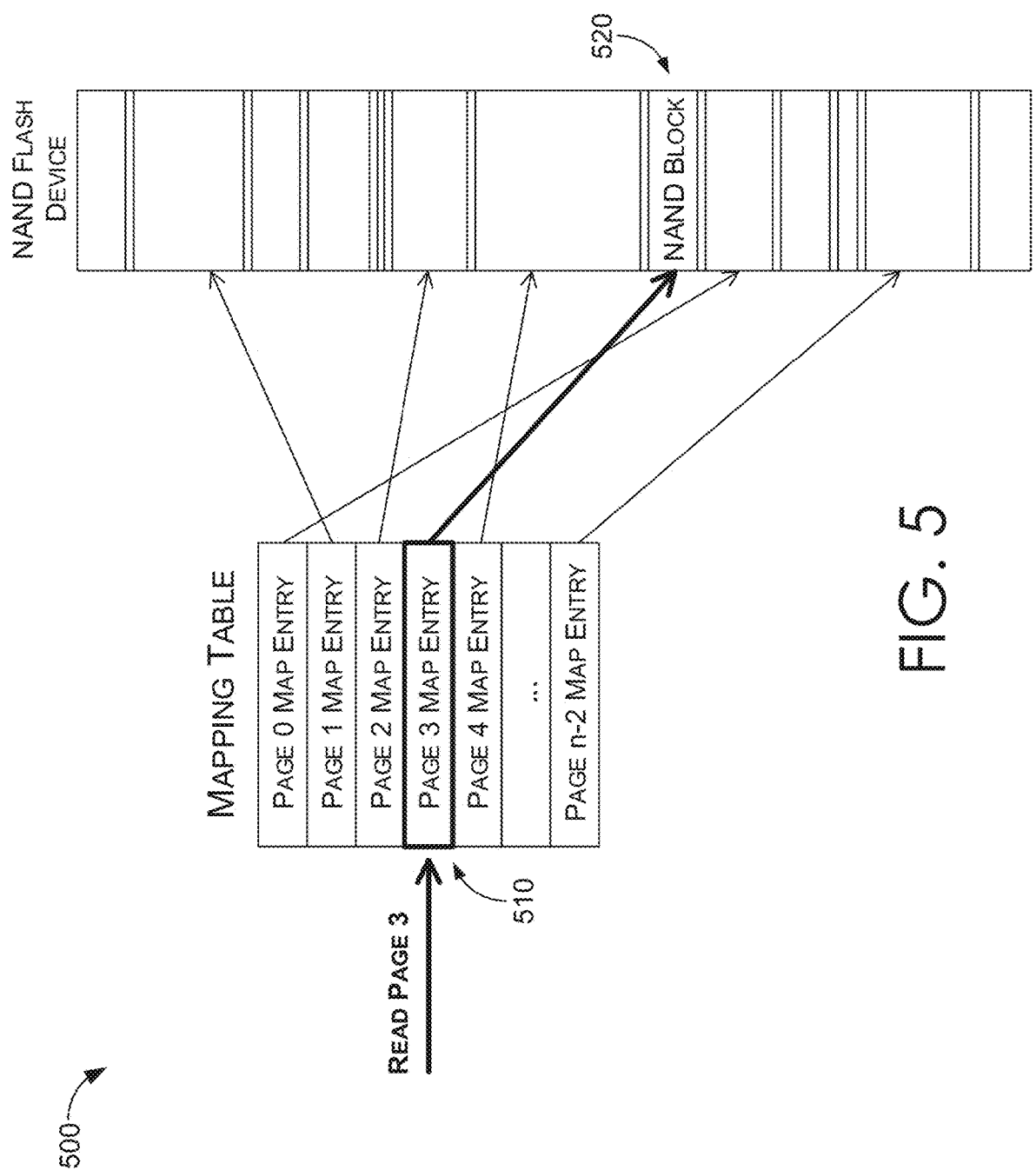
FIG. 5 depicts a block diagram of an example mapping table used to direct computer operations to various blocks of a NAND flash device, in accordance with aspects of the technology described herein.

To help illustrate, FIG. 5 illustrates an example mapping table 400 used to direct computer operations to various blocks of a NAND flash device, in accordance with aspects of the technology described herein. In this example, the computer operation includes a host computer request to read a page 3. In this example, the mapping table 500 indicates that this computer operation is associated with a 2-bit command, and therefore should be handled by the MLC block type. The NAND block identifying engine 360 uses the mapping table 500 to identify the corresponding MLC block type as discussed herein. In this example, the computer operation to "read page 3" is contained in the mapping table 500 as an entry defining a NAND block 150 to handle the request. Thereafter, the corresponding data associated with the computer operation is accessed from the corresponding NAND block 520 as requested by the "read page 3" computer operation. To facilitate identification of the NAND block 520, the entry 510 can include an indication of the block type, the number of regions being of that block type, the start of the block ID per region being of that block type, and an end block ID per region being of that block type, as discussed herein. In this manner, the NAND block identifying engine 360 can perform computer operations based on the block type of the NAND block associated with performing the computer operations.

Continuing with FIG. 3, the output engine 348 provides any requested data to the host computing device 320. For example, after the computer operation generating engine 346 generates the computer operation to be performed by a NAND block of the block type determined by the NAND block identifying engine 360, the output engine 370 communicates the output of the computer operation to the host computing device 320. In one embodiment, the output engine 370 communicates the output via the interface 322.

Turning to FIG. 4, illustrated is an SSD customizing system 300 employing an SSD customizing engine 310 to programmatically customize and employ NAND blocks 150 (FIGS. 1A and 1B) of a NAND flash device 130. Among other engines, managers, generators, selectors, or components not shown (collectively referred to herein as "components"), the technical solution environment of SSD customizing system 300 includes SSD customizing engine 310. As illustrated, the SSD customizing engine 310 includes a database 410 including database disk 410A, a command journal 420 including a command disk 420A, a NAND catalog 430 including NAND catalog disk 430A, NAND mappings 440 including first mapping table disk 440A, second mapping table disk 440B, third mapping table disk 440C, and fourth mapping table disk 440D. As discussed herein and with respect to the transaction engine 340 (FIG. 3), the command journal 420 can log, in the command disk 420A, the command generated by the command-generating engine 344. Similarly, the NAND catalog 430 can log a record of information associated with various SSDs 100 (FIG. 1A) in the NAND catalog disk 430A, and the NAND mappings 440 can log a record of entries of the mapping table in the first mapping table disk 440A, second mapping table disk 440B, third mapping table disk 440C, or fourth mapping table disk 440D.

Embodiments of the SSD customizing engine 310 records inputs from the host computing device 320 in the command disk 420A. For example, the read, write, erase, and program inputs are recording in the command disk 420A. In one embodiment, the command disk 420A stores the input data 332 (FIG. 3) and the command data 334 (FIG. 3). Furthermore, the database 410 is configured to store any data, such as that stored in data sources 330 (FIG. 1). Although the database 410, NAND catalog 430, and the NAND mappings 440 are depicted as being included in a data disk while the command journal 420 is depicted as being included in respective log disks, it should be understood that the database 410, command journal 420, NAND catalog 430, and the NAND mappings 440 can be stored in any suitable storage device or memory device, including but not limited to the features discussed with respect to FIGS. 9 and 10.

Figure 6:
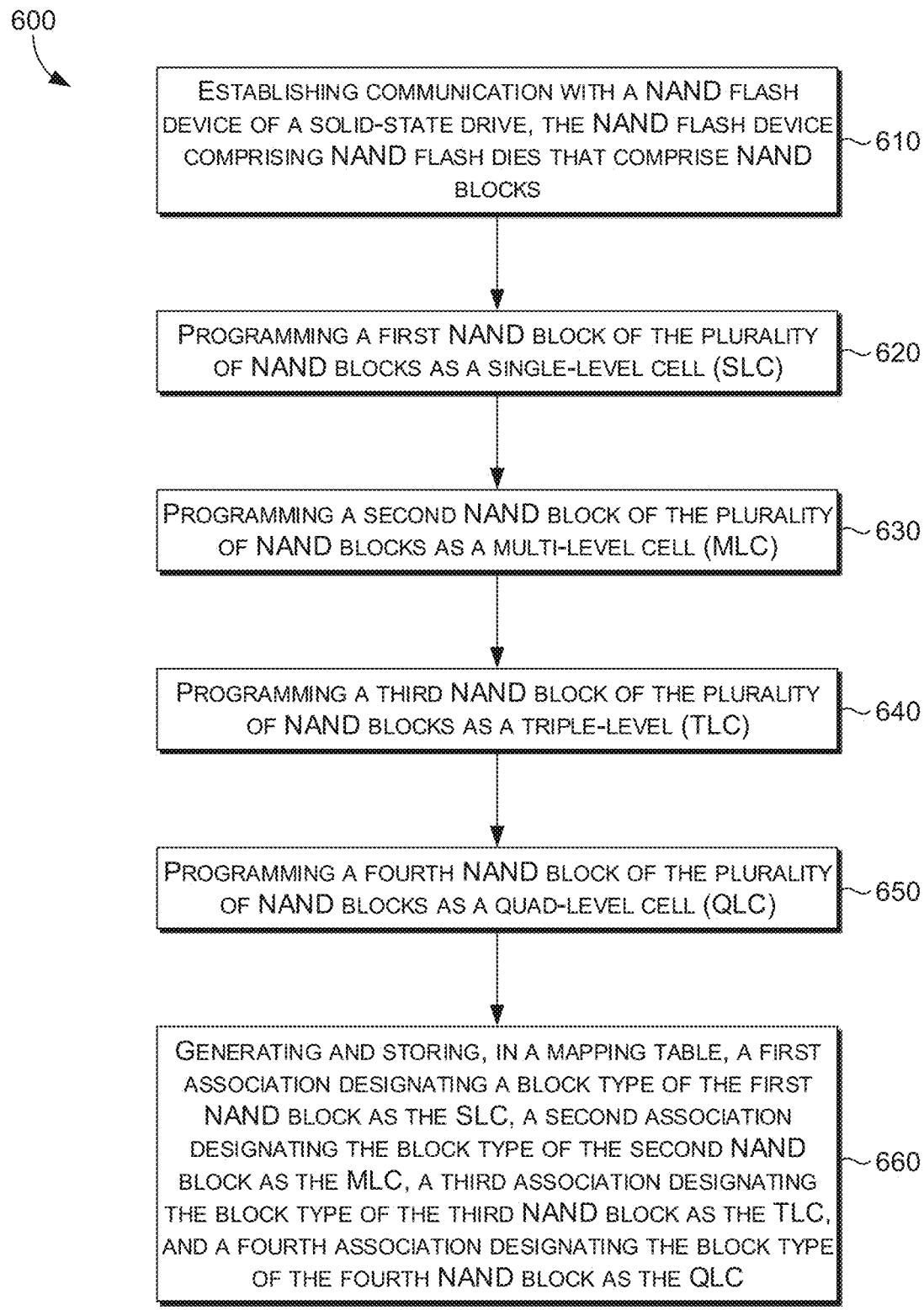
FIG. 6 depicts a first example method to programmatically customize or employ blocks of a NAND flash device using an SSD customizing engine, in accordance with aspects of the technology described herein.
Figure 7:
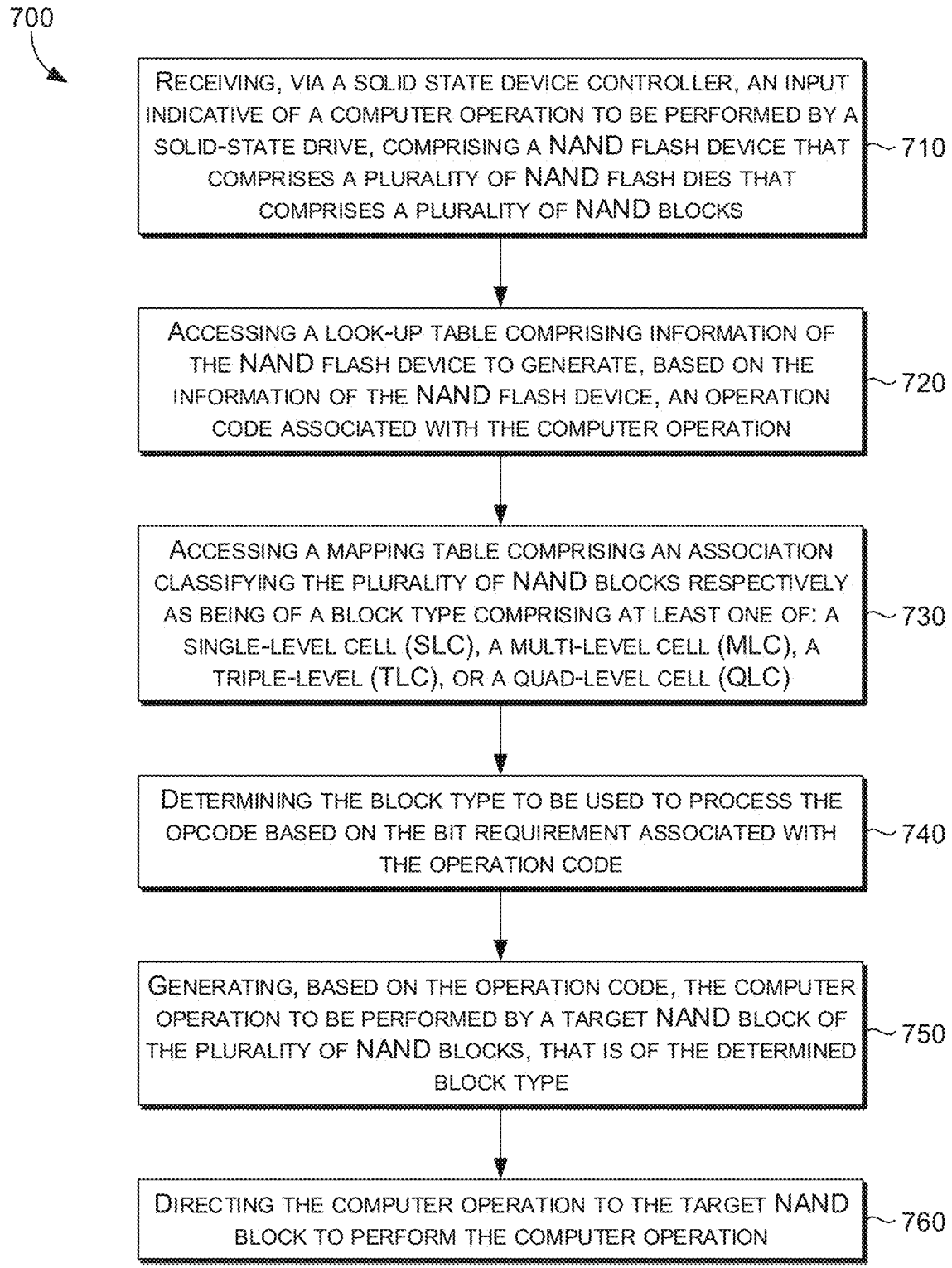
FIG. 7 depicts a second example method to programmatically customize or employ blocks of a NAND flash device using an SSD customizing engine, in accordance with aspects of the technology described herein.
Figure 8:
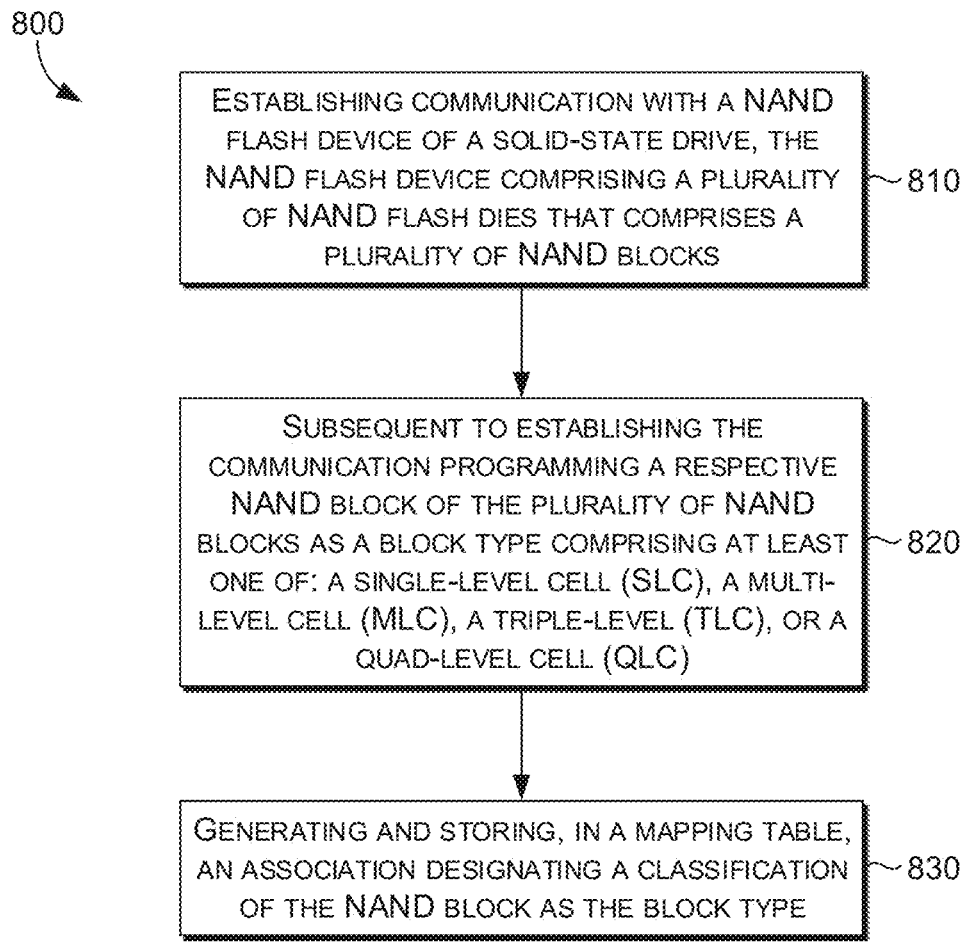
FIG. 8 depicts a third example method to programmatically customize or employ blocks of a NAND flash device using an SSD customizing engine, in accordance with aspects of the technology described herein.

With reference to FIGS. 6, 7, and 8, flow diagrams are provided illustrating methods to programmatically customize or employ NAND blocks 150 (FIG. 1B) of a NAND flash device (FIGS. 1A and 1B) using an SSD customizing engine 310 (FIG. 3). In some embodiments, one or more components of the SSD 100 (FIG. 1A), SSD controller 110 (FIG. 1A), SSD customizing system 300 (FIG. 3), and/or the host computing device 320 (FIG. 3) perform the methods illustrated in FIGS. 4, 5, and 6. In some embodiments, one or more computer storage media having computer-executable or computer-useable instructions embodied thereon that, when executed by one or more processors, cause the one or more processors to perform the methods (e.g., computer-implemented method) in the SSD customizing system 300 (e.g., a computerized system or computing system).

Turning to FIG. 6, at block 610, the process 600 includes establishing communication with a NAND flash device 130 of an SSD 100. In one embodiment, the NAND flash device 130 includes a plurality of NAND flash dies 140 (FIG. 1B) that include a plurality of NAND blocks 150.

At block 620, the process 600 includes programming a first NAND block of the plurality of NAND blocks as a single-level cell (SLC) 210 (FIG. 2). In one embodiment, the first NAND block is programmed subsequent to establishing (block 610) the communication.

At block 630, the process 600 includes programming a second NAND block of the plurality of NAND blocks as a multi-level cell (MLC) 220. In one embodiment, the second NAND block is programmed subsequent to establishing (block 610) the communication.

At block 640, the process 600 includes programming a third NAND block of the plurality of NAND blocks as a triple-level (TLC) 230. In one embodiment, the third NAND block is programmed subsequent to establishing (block 610) the communication.

At block 650, the process 600 includes programming a fourth NAND block of the plurality of NAND blocks as a quad-level cell (QLC) 240. In one embodiment, the fourth NAND block is programmed subsequent to establishing (block 610) the communication.

At block 660, the process 600 includes generating and storing, in at least one mapping table, a first association designating a block type of the first NAND block as the SLC 210, a second association designating the block type of the second NAND block as the MLC 220, a third association designating the block type of the third NAND block as the TLC 230, and a fourth association designating the block type of the fourth NAND block as the QLC 240. An example mapping table is illustrated in FIG. 5. In some embodiments, the first association is stored in a first mapping table indicative of SLCs 210, the second association is stored in a second mapping table indicative of MLCs 220, the third association is stored in a third mapping table indicative of TLCs 230, and the fourth association is stored in a fourth mapping table indicative of QLCs 240.

Turning to FIG. 7, the process 700 includes, at block 710, receiving, via an SSD controller 110 (FIG. 1A), an input indicative of a computer operation to be performed by an SSD 100 (FIG. 1A). In one embodiment, the SSD 100 includes a NAND flash device 130 (FIG. 1A) that includes a plurality of NAND flash dies 140 (FIG. 1B) that include a plurality of NAND blocks 150 (FIG. 1B).

At block 720, the process 700 includes accessing a look-up table comprising information of the NAND flash device 130 to generate an operation code associated with the computer operation. In one embodiment, the operation code is generated based on the information of the NAND flash device.

At block 730, the process 700 includes accessing a mapping table 500 (FIG. 5) comprising an association classifying NAND blocks of the plurality of NAND blocks 150 as a block type comprising at least one of: a single-level cell (SLC) 210 (FIG. 2), a multi-level cell (MLC) 220 (FIG. 2), a triple-level (TLC) 230 (FIG. 2), or a quad-level cell (QLC) 240 (FIG. 2). In some embodiments, the first association is stored in a first mapping table indicative of SLCs 210, the second association is stored in a second mapping table indicative of MLCs 220, the third association is stored in a third mapping table indicative of TLCs 230, and the fourth association is stored in a fourth mapping table indicative of QLCs 240.

At block 740, the process 700 includes determining the block type to be used to process the opcode based on the bit requirement associated with the operation code. At block 750, the process 700 includes generating the computer operation to be performed by a target NAND block 150 that is of the determined block type. In one embodiment, the computer operation is generated based on the operation code. At block 760, the process 700 includes directing the computer operation to the target NAND block to perform the computer operation.

Turning to FIG. 8, the process 800 includes, at block 710, establishing communication with a NAND flash device 130 of an SSD 100. In one embodiment, the NAND flash device 130 includes a plurality of NAND flash dies 140 that include a plurality of NAND blocks 150.

At block 820, the process 800 includes programming a respective NAND block 150 of the plurality of NAND blocks 150 as a block type comprising at least one of: a single-level cell (SLC) 210 (FIG. 2), a multi-level cell (MLC) 220 (FIG. 2), a triple-level (TLC) 230 (FIG. 2), or a quad-level cell (QLC) 240 (FIG. 2). In one embodiment, the respective NAND block 150 is programmed subsequent to establishing (block 810) the communication.

At block 830, the process 800 includes generating and storing, in a mapping table 500 (FIG. 5), an association designating a block type of the NAND block 150. An example mapping table is illustrated in FIG. 5. In some embodiments, a plurality of mapping tables are employed, such as a first mapping table storing associations indicative of SLCs 210, a second mapping table storing associations indicative of MLCs 220, a third mapping table storing associations indicative of TLCs 230, and a fourth mapping table storing associations indicative of QLCs 240.

Other Embodiments

In some embodiments, a computerized system is provided, employing any components of the computerized (or computer, computing, or cloud) system described in any of the embodiments above. The computerized system comprises at least one computer processor, and computer memory having computer-readable instructions embodied thereon, that, when executed by the at least one computer processor, perform operations. The operations comprise establishing communication with a NAND flash device of a solid-state drive, the NAND flash device comprising a plurality of NAND flash dies that comprises a plurality of NAND blocks. In addition, the operations comprise, subsequent to establishing the communication, programming a first NAND block of the plurality of NAND blocks as a single-level cell (SLC); programming a second NAND block of the plurality of NAND blocks as a multi-level cell (MLC); programming a third NAND block of the plurality of NAND blocks as a triple-level (TLC); and programming a fourth NAND block of the plurality of NAND blocks as a quad-level cell (QLC). In addition, the operations comprise generating and storing, in at least one mapping table, a first association designating a block type of the first NAND block as the SLC, a second association designating the block type of the second NAND block as the MLC, a third association designating the block type of the third NAND block as the TLC, and a fourth association designating the block type of the fourth NAND block as the QLC.

In any combination of the above embodiments of the computerized system, the operations further comprise receiving an input indicative of a computer operation to be performed by the solid-state drive; and directing the computer operation to at least one of the first NAND block, the second NAND block, the third NAND block, or the fourth NAND block based at least on the block type.

In any combination of the above embodiments of the computerized system, the operations further comprise receiving an input indicative of a computer operation to be performed by the solid-state drive; determining, from the input, an SSD channel ID, a NAND flash device ID, a NAND flash die ID, a NAND block ID, and a block type ID for the NAND block; determining, from the input, whether the computer operation should be handled by an SLC, MLC, TLC, or QLC; and directing the computer operation to the first, second, third, or fourth NAND block based on (1) whether the computer operation should be handled by a NAND block classified as the SLC, the MLC, the TLC, or the QLC, and (2) at least one of the SSD channel ID, the NAND flash device ID, the NAND flash die ID, the NAND block ID, or the block type ID for the NAND block.

In any combination of the above embodiments of the computerized system, at least one of the first, second, third, or fourth NAND blocks are programmed during a delete operation or an erase operation executed against the at least one of the first, second, third, or fourth NAND blocks.

In any combination of the above embodiments of the computerized system, at least one of the first NAND block, the second NAND block, the third NAND block, or the fourth NAND block are programmed to increase an endurance of the NAND flash device as compared to the endurance of the NAND flash device absent at least one of the first NAND block, the second NAND block, the third NAND block, or the fourth NAND block being programmed.

In any combination of the above embodiments of the computerized system, the operations further comprise accessing a look-up table comprising a vendor ID and a model number associated with the NAND flash device; determining, based on at least one of the vendor ID or the model number, an opcode associated with a computer operation to be performed by the NAND flash device; determining, based on the opcode, a block type of a NAND block to be used to handle the computer operation; identifying, from the at least one mapping table, the NAND block to be used to handle the computer operation and that comprises the block type; and directing the computer operation to the NAND block comprising the block type.

In any combination of the above embodiments of the computerized system, prior to establishing the communication, the NAND flash device is an out-of-the-box NAND flash device.

In any combination of the above embodiments of the computerized system, the out-of-the-box NAND flash device comprises all NAND blocks programmed as only one of: the SLC, the MLC, the TLC, or the QLC.

In any combination of the above embodiments of the computerized system, the system comprises a solid-state drive comprising the at least one processor and the memory.

In any combination of the above embodiments of the computerized system, the at least one mapping table comprises: a first mapping table storing a plurality of first associations classifying a plurality of NAND blocks as the SLC; a second mapping table storing a plurality of second associations classifying a plurality of NAND blocks as the MLC; a third mapping table storing a plurality of third associations classifying a plurality of NAND blocks as the TLC; and a fourth mapping table storing a plurality of fourth associations classifying a plurality of NAND blocks as the QLC.

In some embodiments, a computer-implemented method is provided and is implemented using any of the embodiments described herein. The computer-implemented method includes receiving, via a solid-state device controller, an input indicative of a computer operation to be performed by a solid-state drive, comprising a NAND flash device that comprises a plurality of NAND flash dies that comprises a plurality of NAND blocks; accessing a look-up table comprising information of the NAND flash device to generate, based on the information of the NAND flash device, an opcode associated with the computer operation; accessing a mapping table comprising an association classifying the plurality of NAND blocks respectively as being of a block type comprising at least one of: a single-level cell (SLC), a multi-level cell (MLC), a triple-level (TLC), or a quad-level cell (QLC); determining the block type to be used to process the opcode based on a bit requirement associated with the opcode; generating, based on the opcode and the mapping table, the computer operation to be performed by a target NAND block of the plurality of NAND blocks that is of the determined block type; and directing the computer operation to the target NAND block to perform the computer operation.

In any combination of the above embodiments of the computer-implemented method, the information of the NAND flash device comprises at least one of a vendor ID and a model number.

In any combination of the above embodiments of the computer-implemented method, accessing the mapping table comprises: accessing a plurality of mapping tables comprising a first mapping table associated with an SLC block type comprising the SLC, a second mapping table associated with an MLC block type, a third mapping table associated with a TLC block type, and a fourth mapping table associated with a QLC block type; and based on the determined block type, accessing one of the first mapping table, the second mapping table, the third mapping table, or the fourth mapping table.

In any combination of the above embodiments of the computer-implemented method, the plurality of mapping tables each comprise, for each block: the block type, a number of regions, a start block ID per NAND flash type, and an end block ID.

In any combination of the above embodiments of the computer-implemented method, the information of the NAND flash device comprises at least one of a vendor ID and a model number.

In some embodiments, at least one computer-storage media is provided. The computer-storage media has computer-executable instructions embodied thereon that, when executed by a computing system having at least one processor and at least one memory, cause the computing system or the at least one processor to perform operations comprising: establishing communication with a NAND flash device of a solid-state drive, the NAND flash device comprising a plurality of NAND flash dies that comprises a plurality of NAND blocks; subsequent to establishing the communication, programming a respective NAND block of the plurality of NAND blocks as a block type comprising at least one of: a single-level cell (SLC), a multi-level cell (MLC), a triple-level (TLC), or a quad-level cell (QLC); and generating and storing, in a mapping table, an association designating the block type of the NAND block.

In any combination of the above embodiments of the at least one computer-storage media, the operations further comprise receiving an input indicative of a computer operation to be performed by the solid-state drive; and directing a computer operation to at least one of the first NAND block, the second NAND block, the third NAND block, or the fourth NAND block based at least on the block type.

In any combination of the above embodiments of the at least one computer-storage media, the operations further comprise receiving an input indicative of a computer operation to be performed by the solid-state drive; determining, from the input, an SSD channel ID, a NAND flash device ID, a NAND flash die ID, a NAND block ID, and a block type ID for the NAND block; determining, from the input, whether the computer operation should be handled by an SLC, MLC, TLC, or QLC; and directing the computer operation to the first, second, third, or fourth NAND block based on (1) whether the computer operation should be handled by a NAND block classified as the SLC, the MLC, the TLC, or the QLC, and (2) at least one of the SSD channel ID, the NAND flash device ID, the NAND flash die ID, the NAND block ID, or the block type ID for the NAND block.

In any combination of the above embodiments of the at least one computer-storage media, the operations further comprise accessing a look-up table comprising a vendor ID and a model number associated with the NAND flash device; determining, based on at least one of the vendor ID or the model number, an opcode associated with a computer operation to be performed by the NAND flash device; determining, based on the opcode, a respective block type of a respective NAND block to be used to handle the computer operation; identifying, from the at least one mapping table, the respective NAND block to be used to handle the computer operation and that comprises the respective block type; and directing the computer operation to the respective NAND block comprising the respective block type.

In any combination of the above embodiments of the at least one computer-storage media, prior to establishing the communication, the NAND flash device is an out-of-the-box NAND flash device, and wherein the out-of-the-box NAND flash device comprises all NAND blocks programmed as only one of: the SLC, the MLC, the TLC, or the QLC.

Example Computing Environment

Figure 9:
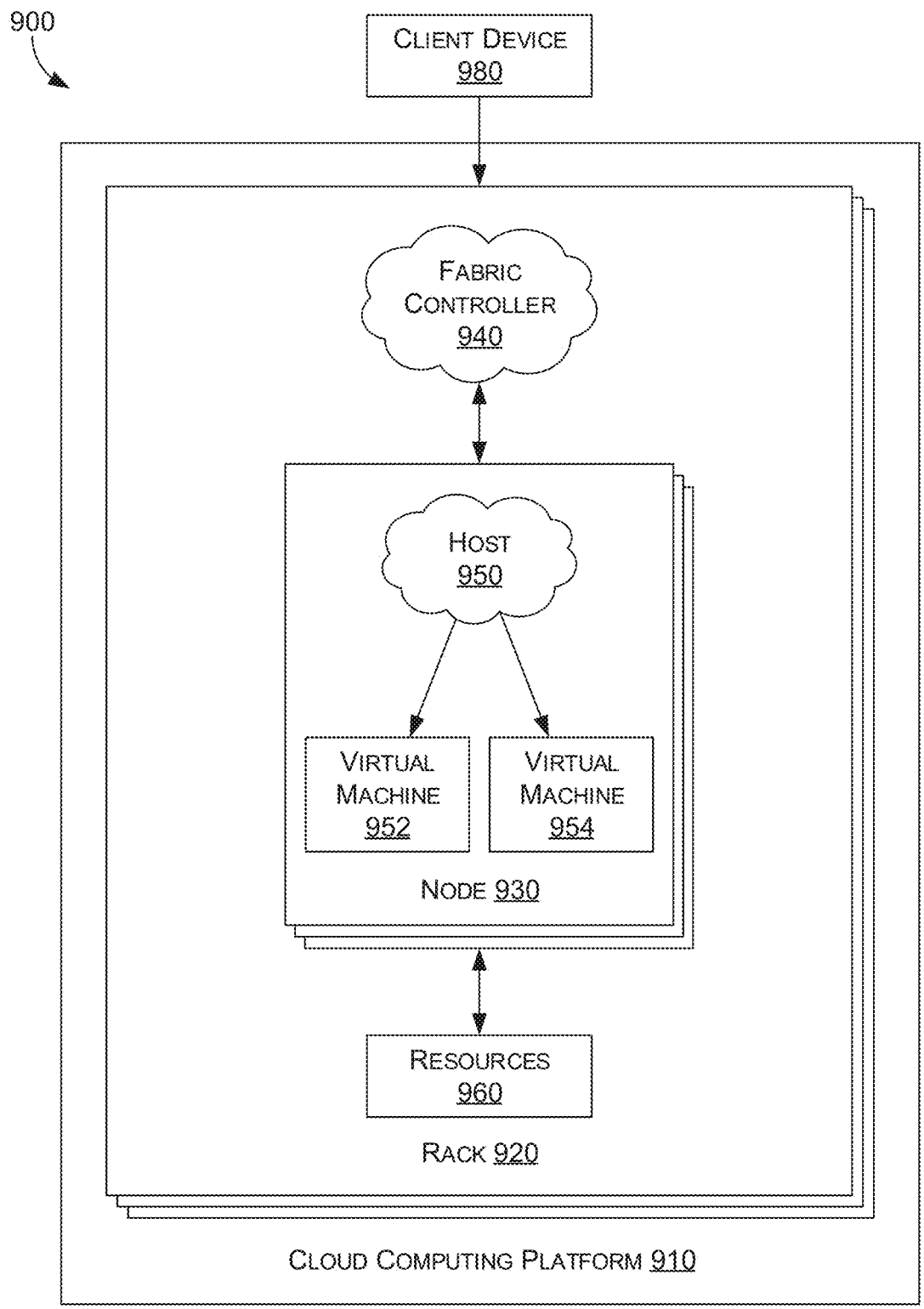
FIG. 9 depicts a block diagram of an example distributed computing environment suitable for use in implementing aspects of the technology described herein.
Figure 10:
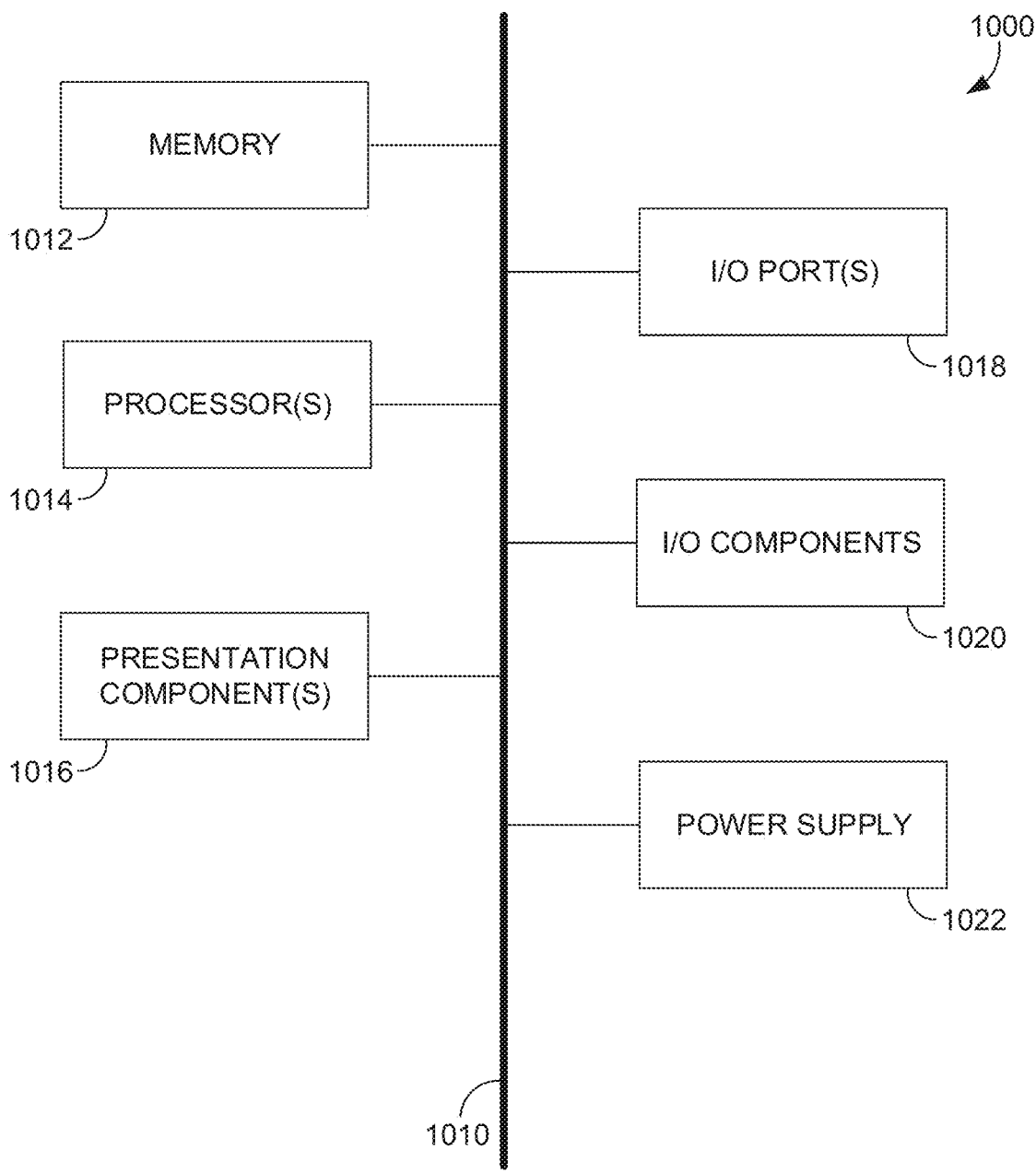
FIG. 10 is a block diagram of an example computing device suitable for use in implementing aspects of the technology described herein.

Having described various implementations, example computing environments suitable for implementing embodiments of the disclosure are now described, including an example distributed computing environment and an example computing device in FIGS. 9 and 10, respectively. Embodiments of the disclosure are described in the general context of computer code or machine-useable instructions, including computer-useable or computer-executable instructions, such as program modules, being executed by a computer or other machine such as a smartphone, a tablet, personal computer (PC), or other mobile device, server, or client device. Generally, program modules, including routines, programs, objects, components, data structures, and the like, refer to code that performs particular tasks or implements particular abstract data types. Embodiments of the disclosure are practiced in a variety of system configurations, including mobile devices, consumer electronics, general-purpose computers, more specialty computing devices, or the like. Embodiments of the disclosure are also practiced in distributed computing environments where tasks are performed by remote-processing devices that are linked through a communications network. In a distributed computing environment, program modules may be located in both local and remote computer storage media including memory storage devices.

Some embodiments comprise an end-to-end software-based system that can operate within system components described herein to operate computer hardware to provide system functionality. At a low level, hardware processors may execute instructions selected from a machine language (also referred to as machine code or native) instruction set for a given processor. The processor recognizes the native instructions and performs corresponding low-level functions relating to, for example, logic, control, and memory operations. Low-level software written in machine code can provide more complex functionality to higher levels of software. Accordingly, in some embodiments, computer-executable instructions include any software, including low-level software written in machine code, higher level software such as application software, and any combination thereof. In this regard, the system components can manage resources and provide services for system functionality. Any other variations and combinations thereof are contemplated with the embodiments of the present disclosure.

Referring now to FIG. 9, FIG. 9 illustrates an example distributed computing environment 900 in which implementations of the present disclosure can be employed. In particular, FIG. 9 shows a high-level architecture of an example cloud computing platform 910 that can host a technical solution environment, or a portion thereof (e.g., a data trustee environment). It should be understood that this and other arrangements described herein are set forth only as examples. For example, as described above, many of the elements described herein are implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 900, which includes cloud computing platform 910, rack 920, and node 930 (e.g., computing devices, processing units, or blades) in rack 920. The technical solution environment can be implemented with cloud computing platform 910 that runs cloud services across different data centers and geographic regions. Cloud computing platform 910 can implement fabric controller 940 component for provisioning and managing resource allocation, deployment, upgrade, and management of cloud services. Typically, cloud computing platform 910 acts to store data or run service applications in a distributed manner. Cloud computing platform 910 in a data center can be configured to host and support operation of endpoints of a particular service application. Cloud computing platform 910 may be a public cloud, a private cloud, or a dedicated cloud.

Node 930 can be provisioned with host 950 (e.g., operating system or runtime environment) running a defined software stack on node 930. Node 930 can also be configured to perform specialized functionality (e.g., compute nodes or storage nodes) within cloud computing platform 910. Node 930 is allocated to run one or more portions of a service application of a tenant. A tenant can refer to a customer utilizing resources of cloud computing platform 910. Service application components of cloud computing platform 910 that support a particular tenant can be referred to as a multi-tenant infrastructure or tenancy. The terms service application, application, or service are used interchangeably herein and broadly refer to any software, or portions of software, that run on top of storage, access storage, and compute device locations within a datacenter.

When more than one separate service application is being supported by nodes 930, nodes 930 may be partitioned into virtual machines (e.g., virtual machine 952 and virtual machine 954). Physical machines can also concurrently run separate service applications. The virtual machines or physical machines can be configured as individualized computing environments that are supported by resources 960 (e.g., hardware resources and software resources) in cloud computing platform 910. It is contemplated that resources can be configured for specific service applications. Further, each service application may be divided into functional portions such that each functional portion is able to run on a separate virtual machine. In cloud computing platform 910, multiple servers may be used to run service applications and perform data storage operations in a cluster. In particular, the servers may perform data operations independently but exposed as a single device referred to as a cluster. Each server in the cluster can be implemented as a node. Client device 980 may be linked to a service application in cloud computing platform 910. Client device 980 may be any type of computing device, which may correspond to computing device

1000 described with reference to FIG. 10. For example, client device 980 is configured to issue commands to cloud computing platform 910. In embodiments, client device 980 communicates with service applications through a virtual Internet Protocol (IP) and load balancer or other means that direct communication requests to designated endpoints in cloud computing platform 910. The components of cloud computing platform 910 may communicate with each other over a network (not shown), which may include, without limitation, one or more local area networks (LANs) and/or wide area networks (WANs).

With reference to FIG. 10, an example computing device is provided and referred to generally as computing device 1000. The computing device 1000 is but one example of a suitable computing environment and is not intended to suggest any limitation as to the scope of use or functionality of embodiments of the disclosure, and nor should the computing device 1000 be interpreted as having any dependency or requirement relating to any one or combination of components illustrated. Computing device 1000 includes bus 1010 that directly or indirectly couples the following devices: memory 1012, one or more processors 1014, one or more presentation components 1016, input/output ports 1018, input/output components 1020, and illustrative power supply 1022. Bus 1010 represents what may be one or more buses (such as an address bus, data bus, or combination thereof). The various blocks of FIG. 10 are shown with lines for the sake of conceptual clarity, and other arrangements of the described components and/or component functionality are also contemplated. A presentation component, such as a display device, is an example of an I/O component. Also, processors have memory. It is recognized that such is the nature of the art, and reiterated that the diagram of FIG. 10 is merely illustrative of an example computing device that can be used in connection with one or more embodiments of the present invention. Distinction is not made between such categories as "workstation," "server," "laptop," "hand-held device," etc., as all are contemplated within the scope of FIG. 10 and with reference to "computing device."

Computing device 1000 typically includes a variety of computer-readable media. Computer-readable media can be any available media that can be accessed by computing device 1000 and includes both volatile and non-volatile media, removable and non-removable media. By way of example, and not limitation, computer-readable media include computer storage media and communication media. Computer storage media includes volatile and non-volatile, removable and non-removable media implemented in any method or technology for the storage of information such as computer-readable instructions, data structures, program modules or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium that can be used to store the desired information and which can be accessed by computing device 1000. Computer storage media excludes signals per se. Communication media typically embodies computer-readable instructions, data structures, program modules, or other data in a modulated data signal such as a carrier wave or other transport mechanism and includes any information delivery media. The term "modulated data signal" indicates a signal that has one or more of its characteristics set or changed in such a manner so as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1012 includes computer storage media in the form of volatile and/or non-volatile memory. The memory may be removable, non-removable, or a combination thereof. Example hardware devices include solid-state memory, hard drives, optical-disc drives, etc. Computing device 1000 includes one or more processors that read data from various entities such as memory 1012 or I/O components 1020. As used herein, the term processor or "a processor" may refer to more than one computer processor. In one example, the term processor (or "a processor") refers to at least one processor, which may be a physical or virtual processor, such as a computer processor on a virtual machine. The term processor (or "a processor") also may refer to a plurality of processors, each of which may be physical or virtual, such as a multiprocessor system, distributed processing or distributed computing architecture, cloud computing system, or parallel processing by more than a single processor. Further, various operations described herein as being executed or performed by a processor may be performed by more than one processor.

Presentation component(s) 1016 present data indications to a user or other device. Example presentation components include a display device, speaker, printing component, vibrating component, etc.

I/O ports 1018 allow computing device 1000 to be logically coupled to other devices including I/O components 1020, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described herein. For instance, various functions may be carried out by a processor executing instructions stored in memory. As such, other arrangements and elements (e.g., machines, interfaces, functions, orders, and groupings of functions) can be used in addition to or instead of those shown.

Embodiments described herein may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving" or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however, the distributed computing environment depicted herein is merely an example. Components can be configured for performing novel aspects of embodiments, where the term "configured for" can refer to "programmed to" perform particular tasks or implement particular abstract data types using code. Further, while embodiments of the present invention generally refer to the technical solution environment and the schematics described herein, it is understood that the techniques described may be extended to other implementation contexts.

As used herein, the terms "application" or "app" may be employed interchangeably to refer to any software-based program, package, or product that is executable via one or more (physical or virtual) computing machines or devices. An application may be any set of software products that, when executed, provide an end-user with one or more computational and/or data services. In some embodiments, an application may refer to a set of applications that may be executed together to provide the one or more computational and/or data services. The applications included in a set of applications may be executed serially, in parallel, or any combination thereof. The execution of multiple applications (comprising a single application) may be interleaved. For example, an application may include a first application and a second application. An execution of the application may include the serial execution of the first and second applications or a parallel execution of the first and second applications. In other embodiments, the execution of the first and second applications may be interleaved.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well-adapted to attain all the ends and objects hereinabove set forth together with other advantages which are obvious and which are inherent to the structure.

It will be understood that certain features and subcombinations are of utility and may be employed without reference to other features or subcombinations. This is contemplated by and is within the scope of the claims.

What is claimed is:

1. A computerized system, comprising:
at least one processor; and
computer memory storing computer-useable instructions that, when executed by the at least one processor, cause the at least one processor to perform operations comprising:
establishing communication with a NAND flash device of a solid-state drive, the NAND flash device comprising a plurality of NAND flash dies that comprises a plurality of NAND blocks;
determining a plurality of block types to program the plurality of NAND blocks to;
subsequent to establishing the communication, causing:
programming a first NAND block of the plurality of NAND blocks as a single-level cell (SLC) based on a first block type of the plurality of block types;
programming a second NAND block of the plurality of NAND blocks as a multi-level cell (MLC) based on a second block type of the plurality of block types;
programming a third NAND block of the plurality of NAND blocks as a triple-level (TLC) based on a first third type of the plurality of block types; and
programming a fourth NAND block of the plurality of NAND blocks as a quad-level cell (QLC) based on a fourth block type of the plurality of block types;
generating and storing, in at least one mapping table, a first association designating the first block type of the first NAND block as the SLC, a second association designating the second block type of the second NAND block as the MLC, a third association designating the third block type of the third NAND block as the TLC, and a fourth association designating the fourth block type of the fourth NAND block as the QLC;
determining a bit requirement associated with an operation code indicating a computer operation to be performed by the solid-state drive;
determining based on the bit requirement and the mapping table at least one of the first NAND block, the second NAND, the third NAND block, and the fourth NAND block to perform the operation;
receiving an input indicative of the computer operation to be performed by the solid-state drive;
determining, from the input, an SSD channel ID, a NAND flash device ID, a NAND flash die ID, a NAND block ID, and a block type ID for the NAND block;
determining, from the input, whether the computer operation should be handled by an SLC, MLC, TLC, or QLC; and
directing the computer operation to the first, second, third, or fourth NAND block based on (1) whether the computer operation should be handled by a NAND block classified as the SLC, the MLC, the TLC, or the QLC, and (2) at least one of the SSD channel ID, the NAND flash device ID, the NAND flash die ID, the NAND block ID, or the block type ID for the NAND block.

2. The computerized system of claim 1, wherein the operations further comprise:
receiving an input indicative of the computer operation to be performed by the solid-state drive; and directing the computer operation to at least one of the first NAND block, the second NAND block, the third NAND block, or the fourth NAND block based at least on the block type.

3. The computerized system of claim 1, wherein at least one of the first, second, third, or fourth NAND blocks are programmed during a delete operation or an erase operation executed against the at least one of the first, second, third, or fourth NAND blocks.

4. The computerized system of claim 1, wherein at least one of the first NAND block, the second NAND block, the third NAND block, or the fourth NAND block are programmed to increase an endurance of the NAND flash device as compared to the endurance of the NAND flash device absent at least one of the first NAND block, the second NAND block, the third NAND block, or the fourth NAND block being programmed.

5. The computerized system of claim 1, wherein the operations further comprise:
  accessing a look-up table comprising a vendor ID and a model number associated with the NAND flash device;
  determining, based on at least one of the vendor ID or the model number, the operation code associated with the computer operation to be performed by the NAND flash device;
  determining, based on the operating code, a block type of a NAND block to be used to handle the computer operation;
  identifying, from the at least one mapping table, the NAND block to be used to handle the computer operation and that comprises the block type; and
  directing the computer operation to the NAND block comprising the block type.

6. The computerized system of claim 1, wherein, prior to establishing the communication, the plurality of NAND blocks of the NAND flash device are programmed based on a single block type of the plurality of block types.

7. The computerized system of claim 6, wherein as the single block type is only one of: the SLC, the MLC, the TLC, or the QLC.

8. The computerized system of claim 1, wherein the solid-state drive comprises the at least one processor and the memory.

9. The computerized system of claim 1, wherein the at least one mapping table comprises:
  a first mapping table storing a plurality of first associations classifying a first portion of the plurality of NAND blocks as the SLC;
  a second mapping table storing a plurality of second associations classifying a second portion of the plurality of NAND blocks as the MLC;
  a third mapping table storing a plurality of third associations classifying a third portion of the plurality of NAND blocks as the TLC; and
  a fourth mapping table storing a plurality of fourth associations classifying a fourth portion of the plurality of NAND blocks as the QLC.

10. The computerized system of claim 1, wherein the computerized system further includes a plurality of solid-state drives of which the solid-state drive is a member.

11. A computer-implemented method, comprising:
  receiving, via a solid-state device controller, an input indicative of a computer operation to be performed by a solid-state drive, comprising a NAND flash device that comprises a plurality of NAND flash dies that comprises a plurality of NAND blocks;
  accessing a look-up table comprising information of the NAND flash device to generate, based on the information of the NAND flash device, an opcode associated with the computer operation;
  accessing a mapping table comprising an association classifying the plurality of NAND blocks respectively as being of a block type comprising at least one of: a single-level cell (SLC), a multi-level cell (MLC), a triple-level (TLC), or a quad-level cell (QLC);
  determining the block type to be used to process the opcode based on a bit requirement associated with the opcode;
  generating the computer operation to be performed by a target NAND block of the plurality of NAND blocks based on the mapping table indicating that the target NAND block is of the block type be used to process the opcode based on the bit requirement associated with the opcode, wherein the mapping table is accessed from a plurality of mapping tables comprising a first mapping table associated with an SLC block type, a second mapping table associated with an MLC block type, a third mapping table associated with a TLC block type, and a fourth mapping table associated with a QLC block type and based on the block type, accessing one of the first mapping table, the second mapping table, the third mapping table, or the fourth mapping table; and
  directing the computer operation to the target NAND block to perform the computer operation.

12. The computer-implemented method of claim 11, wherein the information of the NAND flash device comprises at least one of a vendor ID and a model number.

13. The computer-implemented method of claim 12, wherein the opcode is included in the input indicative of the computer operation and the bit requirement associated with the opcode is determined based on at least one of a vendor ID and a model number.

14. The computer-implemented method of claim 11, wherein the plurality of mapping tables each comprise, for each block: the block type, a number of regions, a start block ID per NAND flash type, and an end block ID.

15. The computer-implemented method of claim 11, wherein, prior to receiving the input indicative of the computer operation to be performed by the solid-state drive, the plurality of NAND blocks are programmed based on a single block type of the block types.

16. One or more computer storage media having computer-executable instructions embodied thereon that, when executed by a computing system having at least one processor and at least one memory, cause the at least one processor to perform operations comprising:
  establishing communication with a NAND flash device of a solid-state drive, the NAND flash device comprising a plurality of NAND flash dies that comprises a plurality of NAND blocks;
  determining a plurality of block types associated with the NAND flash device;
  subsequent to establishing the communication, programming a respective NAND block of the plurality of NAND blocks as a block type of the plurality of block types comprising at least one of: a single-level cell (SLC), a multi-level cell (MLC), a triple-level (TLC), or a quad-level cell (QLC);
  storing, in a mapping table, an association indicating that the respective NAND block is of the block type;

determining a bit requirement associated with an operation code indicated in a computer operation to be performed by the solid-state drive;

determining based on the bit requirement and the mapping table to cause the respective NAND block to perform the operation; and receiving an input indicative of the computer operation to be performed by the solid-state drive;

determining, from the input, an SSD channel ID, a NAND flash device ID, a NAND flash die ID, a NAND block ID, and a block type ID for the NAND block;

determining, from the input, whether the computer operation should be handled by an SLC, MLC, TLC, or QLC; and directing the computer operation to the respective NAND block based on (1) whether the computer operation should be handled by a NAND block classified as the SLC, the MLC, the TLC, or the QLC, and (2) at least one of the SSD channel ID, the NAND flash device ID, the NAND flash die ID, the NAND block ID, or the block type ID for the NAND block.

17. The one or more computer storage media of claim 16, wherein the operations further comprise:

receiving an input indicative of the computer operation to be performed by the solid-state drive.

18. The one or more computer storage media of claim 16, wherein the operations further comprise:

accessing a look-up table comprising a vendor ID and a model number associated with the NAND flash device;

determining, based on at least one of the vendor ID or the model number, the operation code associated with the computer operation to be performed by the NAND flash device;

determining, based on the opcode, the block type to be used to handle the computer operation;

identifying, from the at least one mapping table, the respective NAND block to be used to handle the computer operation and that comprises the respective block type; and directing the computer operation to the respective NAND block.

19. The one or more computer storage media of claim 16, wherein, prior to establishing the communication, the NAND flash device comprises all NAND blocks programmed as only one of: the SLC, the MLC, the TLC, or the QLC.

20. The one or more computer storage media of claim 16, wherein the computing system includes a plurality of solid-state drives of which the solid-state drive is a member.

\* \* \* \* \*